United States Patent [19]

Woodsum et al.

[11] Patent Number: 5,784,339
[45] Date of Patent: Jul. 21, 1998

[54] UNDERWATER LOCATION AND COMMUNICATION SYSTEM

[75] Inventors: Harvey C. Woodsum, Bedford; William Hogan, Mont Vernon, both of N.H.

[73] Assignee: Ocean Vision Technology, Inc., Naples, Fla.

[21] Appl. No.: 842,602

[22] Filed: Apr. 16, 1997

[51] Int. Cl.$^6$ ................................................ H04B 11/00
[52] U.S. Cl. ................................................ 367/134
[58] Field of Search ............................ 367/134, 6, 100, 367/101, 102

[56] References Cited

U.S. PATENT DOCUMENTS

| | | | |
|---|---|---|---|
| 3,587,038 | 6/1971 | Massa | 367/118 |
| 3,860,900 | 1/1975 | Scudder | 367/6 |
| 3,944,967 | 3/1976 | Acks et al. | 367/6 |
| 4,176,338 | 11/1979 | Spindel et al. | 367/6 |
| 4,604,733 | 8/1986 | Brown et al. | 367/134 |
| 4,703,462 | 10/1987 | Woodsum | 367/92 |
| 5,008,860 | 4/1991 | Riley et al. | 367/6 |
| 5,018,114 | 5/1991 | Mackelburg et al. | 367/134 |
| 5,077,703 | 12/1991 | Strauss | 367/118 |
| 5,185,725 | 2/1993 | Kent et al. | 367/6 |
| 5,212,490 | 5/1993 | Nelson et al. | 367/100 |
| 5,235,558 | 8/1993 | Woodsum et al. | 367/92 |
| 5,237,541 | 8/1993 | Woodsum | 367/92 |
| 5,305,286 | 4/1994 | Woodsum et al. | 367/92 |
| 5,469,403 | 11/1995 | Young et al. | 367/134 |
| 5,559,757 | 9/1996 | Catipovic et al. | 367/134 |

*Primary Examiner*—Daniel T. Pihulic
*Attorney, Agent, or Firm*—Davis and Bujold

[57] ABSTRACT

A communication and position determining device for use in an underwater communication and position determining system wherein the device transmits a sequence of one or more data words, wherein each data word includes a plurality of data bits transmitted in parallel as a corresponding number of concurrently transmitted signals, each of which occupies a different frequency band. The signals have waveforms selected from a pair of fade resistant waveforms that can be discriminated from one another, to represent binary data and the frequency bands are separated from one another by guard bands having widths sufficient to prevent intersymbol interference between the signals representing the data bits of a data word due, for example, to doppler and phase/frequency shifting, and successive data words are separated sequentially in time by intervals having a duration sufficient to prevent intersymbol interference between the signals of successive data words due to multipath reverberation. A single one of the signals of a data word is used for position determination wherein two devices each determine the bearing to one another from the bearing of the signals received from the other and a round trip propagation time determined from the time delay in transmitting an interrogation data word, a first response data word and a second response data word. Various alternative implementations of the invention are described.

27 Claims, 7 Drawing Sheets

UNDERWATER LOCATION AND COMMUNICATION SYSTEM

FIELD OF THE INVENTION

The present invention relates to an underwater location and communication system and, in particular, to an underwater location and communication system using the simultaneous transmission of a plurality of acoustic signals at different frequencies and at selected intervals for relative position determination and communication between units.

BACKGROUND OF THE INVENTION

The performance of various tasks underwater first became truly practical as early as 1819 with the invention of the diving suit with a helmet and air supply from the surface by Augustus Siebe in 1819 and has become a relatively common endeavor since the invention of the self-contained diving system by Jacque Cousteau and his associates after World War II and the parallel development of small submersible craft and associated support systems. A recurring and continuing problem in performing tasks under the surface of the water, however, whether in the oceans, lakes, rivers, harbors or other bodies of water, is in identifying the location of a diver or submersible with respect to another diver, a submersible, a surface craft or an otherwise known position, such as a marker of some form, and communicating between, for example, a diver and another diver, a submersible or a surface craft.

This problem arises from the nature of the environment itself in that most forms of communication and position determination depend upon the transmission of light or electromagnetic energy through the surrounding medium. Light and electromagnetic energy, however, and except in relatively rare conditions and applications, such as extremely low frequency radio transmissions and laser transmitters operating in one of the few open frequency "windows" of water, do not propagate well or reliably through water. Light and electromagnetic energy are rapidly attenuated in water even in optimum conditions, usually within a few feet or even inches, and light is additionally blocked by dissolved or particulate matter in the water.

Acoustic energy, however, propagates well through water and, as a consequence, most position determination and communication systems of the prior art have been based upon the use of sound transmission to convey information and to identify the locations of, for example, divers and submersibles, with respect to other divers, a surface craft, a submersible or navigational beacons or markers. For example, the typical underwater communication systems of the prior art use amplitude, phase or frequency modulation of an acoustic carrier signal to convey information, such as voice signals or digitally encoded data, as well as binary frequency shift keying, frequency shift keying, and phase shift keying.

The position determination systems of the prior art, in turn, may be generally classified as hyperbolic systems, cross bearing systems, range and bearing transponder systems or passive bearing/range rate tracking systems. Hyperbolic positioning systems, for example, transmit a signal from one unit, such as a diver or submersible, to a plurality of receiving units having known locations and determine the location of the transmitting unit relative to the receiving units as a function of the times of arrival of the signal at the different receiving units. The operation of such systems may be reversed to use a single receiving unit and multiple synchronized transmitting units having known locations, with the position of the receiving unit being calculated from the times of arrivals of the signals from the transmitting units.

Cross bearing positioning systems depend upon the assumption that the signal from a transmitting unit travels a straight path to two or more receiving units having known locations, so that the position of the transmitting unit can determined from the angles at which the signal is received at the receiving units. Again, such systems may be reversed to use multiple transmitting units and a single receiving unit.

Range and bearing transponder positioning systems require only a single transmitting unit and a single receiving unit and transmit a signal from a first unit to a second unit, which responds by transmitting a response signal back to the first unit. The system then determines the position of the second unit with respect to the first unit by measuring the angle of reception of the response signal at the first unit and the distance between the units as function of the round trip transmission time between the units.

Finally, passive bearing/range rate tracking systems establish an initial position of a first unit with respect to a second unit, either by starting from a known position or by initially operating as one of the above described types of system. The first unit, that is, the active unit, the continues to transmit a signal, either continuously or periodically, and the second unit, which is passive, tracks changes in the angular location of the first unit with respect to the second unit and extracts doppler information from the transmissions of the first unit wherein the doppler information represents relative movement between the units. The second unit will use the angular change and doppler information to determine the relative motion of the first unit with respect to the second unit, and therefore the position of the first unit.

All of the acoustic communication and position determining systems of the prior art, however, suffer from problems arising from the medium in which they operate. For example, and ignoring for the moment the effects of the bottom and surface on the transmission of sound in a body of water, as well as other obstacles, most bodies of water do not provide a uniform acoustic transmission medium, except under relatively rare conditions. That is, and in general, any significantly large body of water, such as the ocean, is effectively stratified into layers wherein in each layer the speed of sound propagation is a generally linear gradient function of the temperature, salinity and depth, or pressure, in the layer. Therefore, not only does the speed of propagation of sound vary within a layer, at least as a function of depth, but the temperature and salinity of the layers differ so that there are discontinuities in the speed of sound propagation at the layer boundaries.

The inhomogeneous nature of sound propagation in water thereby causes time varying variations in the transmission time between a transmitting unit and a receiving unit, even within a single layer. In addition, the discontinuities in the speed of sound transmission at the boundaries between layers result in partial or complete refraction and even reflection of the signal at the boundaries, while the surface and bottom of the water, variations in the bottom profile and other obstacles cause additional reflections, so that a given signal will travel from its source to a destination along multiple paths.

Therefore, not only will the transmission time between a transmitting unit and a receiving unit vary with time and depth, even within a single layer, but the multiplicity of transmission paths resulting from refraction and reflection will result in different "versions" of the signal arriving at the receiving unit at different times, an effect often referred to as multipath reverberation delay, so that the received signal appears to be "spread" in time and phase. This, in turn, may result in mutual interference between the received versions of the original signal due to overlap of the received versions of the signal, and may result in interference between the received versions of successive signals. For example, In communications systems transmitting and receiving data in digital form, wherein each transmission is comprised of the sequential transmission of the data bits of a block of data, the "spread" of the signal when received may exceed the time interval between the individual data bits of the block of data, resulting in interference, often referred to as "intersymbol interference", between individual data bits. In some instances, the "spread", or reverberation delay, may result in interference between the transmissions of successive data blocks, again generally referred to as "intersymbol interference".

In addition, not only may there be mutual interference between the versions of the signal as received, or between sequential transmissions, but each received version of a given transmitted signal will additionally differ in its frequency components and phase characteristics depending upon the transmission characteristics of the particular path taken by a given version of the signal. For example, each reflection will result in an absorption of a frequency dependent part of the signal energy, depending upon the nature and characteristics of the two media at the reflection boundary, while each refraction will result in a division of the signal energy between the two resultant paths, which may also be frequency dependent. Also, the absorption or dissipation of acoustic energy by the water along any path is time varying and dependent upon the frequency of the acoustic energy, the temperature, salinity and pressure of the water, particulate or dissolved matter in the water, and the length of the path. As a consequence, the received signal will generally be subject to frequency dependent "fading" or complete loss of frequency components or even of the entire signal.

The result will be significant errors in determining the time of arrival of the signal at a receiving unit, as well as corresponding errors in determining the transmission time between two units, and significant errors in determining the angle of arrival of the signal when different versions of the signal arriving from different angles along different paths. These errors are further compounded due to mutual interference between the different received versions of the signal and due to frequency dependent fading or loss of at least components of the signal.

It is therefore apparent that the acoustic transmission characteristics of water have a significant adverse affect on the position determining systems of the prior art, for example, from reverberation delay and variations in the propagation time of the signals resulting errors in determining the time of arrival of the signal. It is also apparent that the acoustic transmission characteristics of water have a similar adverse affect on the communications systems of the prior art. For example, frequency selective "fading" and intersymbol interference will result in data loss in such communications systems as binary frequency shift keying systems, frequency shift keying systems, and phase shift keying systems. It is also apparent that while certain of these problems are most significant in large bodies of water, such as multipath transmission resulting from layer refraction in the ocean, others, such as multipath transmission from reflection, will be present and frequently even more severe in other environments, such as rivers and harbors.

The present invention provides a solution to these and other problems of the prior art.

SUMMARY OF THE INVENTION

The present invention is directed to a communication and position determining device for use in an underwater location and communication system.

According to the present invention, the communication and position determining device includes a control unit for selecting a sequence of one or more data words containing information to be communicated to a second communication and position determining device, a signal generator responsive to each data word for generating a plurality of concurrent signals representing a data word, and an acoustic transducer connected from the signal generator for concurrently transmitting the plurality of signals representing a data word.

Each data word includes a plurality of data bits and each signal represents a data bit of a data word and occupies a different frequency band. The signals have waveforms selected from a pair of fade resistant waveforms that can be discriminated from one another, wherein one waveform of the pair represents a logic 1 and the other waveform represents a logic 0, and the frequency bands are separated from one another by guard bands having widths sufficient to prevent intersymbol interference between the signals representing the data bits of a data word. Successive data words are separated sequentially in time by intervals having a duration sufficient to prevent intersymbol interference between the signals of successive data words.

According to the present invention, the width of the guard bands in frequency is greater than signal doppler and phase/frequency shifts arising from the propagation characteristics of the signals through water along the signal propagation paths between the communication and position determining devices and the separation in time between successive data words is greater than the multipath reverberation time along the signal propagation paths between the communication and position determining devices.

Also according to the present invention, each signal is a frequency modulated signal, such as a hyperbolic swept frequency modulated signal, and each signal is selected from one of a pair of upswept and downswept frequency modulated signals.

The signals may also be orthogonal pseudo-noise sequences, pulsed phase modulated carriers, or binary frequency shift keyed signals.

Further according to the present invention, each communication and position determining device further includes a receiving hydrophone assembly for receiving signals transmitted by another communication and position determining device, a signal processing unit connected from the receiving hydrophone assembly for detecting the signals transmitted by the other communication and position determining device, identifying the signals representing the data bits of each data word transmitted by the other communication and position determining device, and providing outputs representing the data transmitted in the data words by the other communication and position determining device.

According to the present invention, the control unit responsive is to a user command to determine the location of the communication and position determining unit with respect to another communication and position determining unit for generating an interrogation data word, the signal generator is responsive to the interrogation data word for generating the signals of the interrogation data word wherein at least one signal of the interrogation data word is an interrogation signal, and the acoustic transducer is responsive to the signal generator for transmitting the signals of the interrogation data word, including the at least one interrogation signal.

The communication and position determining device further includes a directional receiving hydrophone assembly for receiving a data word transmitted by another communication and position determining device and generating omni, sine and cosine signals respectively representing the data word signals and the sine and cosine directional components of the data word signals received by the hydrophone assembly. A signal processing unit is connected from the directional receiving hydrophone and responsive to a first response signal of a first response data word transmitted by another communication and position determining device in response to the interrogation data word for detecting the time of reception the first response signal and determining the bearing of reception of the first response signal wherein the bearing of reception of the first response signal represents the bearing of the other communication and position determining device with respect to the communication and position determining device. The signal processing unit determines the range between the communication and position determining device and the other communication and position determining device as a function of the round trip propagation interval between the communication and position determining units as represented by the interval between the transmission of the interrogation signal of the interrogation data word and the reception of the first response signal of the first response data word.

According to the present invention, the control unit is responsive to the reception of the first response signal for generating a second response data word, the signal generator is responsive to the second response data word for generating the signals of the second response data word wherein at least one signal of the second response data word is a second response signal, and the acoustic transducer is responsive to the signal generator for transmitting the signals of the second response data word, including the at least one second response signal The signal processing unit of a communication and position determining device is responsive to an interrogation signal of an interrogation data word transmitted by another communication and position determining device for detecting the time of reception the interrogation signal and determining the bearing of reception of the interrogation signal wherein the bearing of reception of the interrogation signal represents the bearing of the other communication and position determining device with respect to the communication and position determining device.

The control unit, in turn, is responsive to the interrogation signal for generating a first response data word, the signal generator is responsive to the first response data word for generating the signals of the first response data word wherein at least one signal of the first response data word is a first response signal, and the acoustic transducer is responsive to the signal generator for transmitting the signals of the first response data word, including the at least one first response signal.

The signal processing unit is then responsive to a second response signal of a second response data word transmitted by another communication and position determining device in response to the interrogation data word for detecting the time of reception the second response signal and determining the bearing of reception of the second response signal wherein the bearing of reception of the second response signal represents the bearing of the other communication and position determining device with respect to the communication and position determining device. The signal processing unit also determines the range between the communication and position determining device and the other communication and position determining device as represented by the round trip propagation interval between the communication and position determining units as represented by the interval between the transmission of the first response signal of the first response data word and the reception of the second response signal of the second response data word, and determines the range between the communication and position determining device and the other communication and position determining device as represented by the round trip propagation interval between the communication and position determining units as represented by the interval between the transmission of the interrogation signal of the interrogation data word and the reception of the first response signal of the first response data word.

Still further according to the present invention, the signal processing unit is also responsive to the received signals of each data word transmitted by the other communication and position determining device for identifying the signals representing the data bits of each data word transmitted by the other communication and position determining device and providing outputs representing the data transmitted in the data words by the other communication and position determining device.

In a present embodiment, the directional receiving hydrophone assembly includes a vertically oriented, horizontally directional hydrophone having a plurality of directionally oriented receiving segments, a corresponding plurality of first signal combiners connected from the receiving segments for generating first combined signals representing the signals received by directionally oriented pairs of receiving segments, and sine, cosine and omni channel signal combiners connected from the plurality of first signal combiners to generate sine, cosine and omni signals respectively representing directional sine and cosine components of the signals received by the segments and a non-directional sum of the signals received by the segments.

In a further embodiment, the hydrophone assembly also includes a horizontally oriented, vertically directional hydrophone having a plurality of directionally oriented receiving segments, a corresponding plurality of first signal combiners connected from the receiving segments of the vertical directional hydrophone for generating first combined signals representing the signals received by directionally oriented pairs of receiving segments of the vertical directional hydrophone, and vertical sine, cosine and omni channel signal combiners connected from the plurality of first signal combiners to generate vertical sine, cosine and omni signals respectively representing directional sine and cosine components of the signals received by the segments of the vertical directional hydrophone and a non-directional sum of the signals received by the segments of the vertical directional hydrophone.

The communication and position determining device also includes a signal preprocessor connected between the directional receiving hydrophone assembly and the signal processing unit. The signal preprocessor includes a preprocessing channel for each of the omni, sine and cosine signals, wherein each preprocessing channel includes a bandpass filter connected from a corresponding one of the omni, sine and cosine signals and having a bandwidth determined by the total bandwidth of the frequency bands. An analog to digital converter is connected from each bandpass filter to convert the corresponding one of the filtered omni, sine and cosine signals into a digital time domain representation of the corresponding one of the filtered omni, sine and cosine signals, and a received signal sample memory is connected from each analog to digital filter for storing time sequential samples of the corresponding one of the filtered omni, sine and cosine signals. Finally, a multiplexer is connected from the received signal sample memories for sequentially providing the stored time sequential samples of the filtered omni, sine and cosine signals to the signal processing unit.

In those communication and position determining devices having both horizontal and vertical directional receiving hydrophones, each hydrophone may be provided with a signal preprocessor, or a preprocessor may be shared by means of an input multiplexer connected from the omni, sine and cosine signals of the horizontal and vertical hydrophone assemblies for selecting and providing as omni, sine and cosine signal outputs from the input multiplexer the omni, sine and cosine signals of the horizontal and vertical hydrophone assemblies.

According to a presently preferred embodiment of the present invention, the signal processing unit includes a downsampler and digital bandpass filter for sampling the time sequential samples of the omni, sine and cosine signals at an undersampling frequency lower than twice the highest signal frequency of the omni, sine and cosine signals to create a set of non-overlapping spectral aliases and for selecting one of the spectral aliases. A replica correlator is connected from the downsampler and digital bandpass filter for performing a replica correlation on the selected spectral alias and includes a buffer and fast fourier transform processor for performing a buffered fast fourier transform of the selected spectral analysis, a replica generator for generating frequency domain replicas of the signals comprising the data words, a vector multiplier for performing a frequency domain vector multiplication of the buffered fast fourier transform of the selected spectral alias and the time domain replicas of the signals, and an inverse fast fourier transform processor for providing as an output the cross correlation between the selected spectral alias and the time domain replicas of the signals.

A threshold detector with constant false alarm rate, moving average threshold is connected from the replica correlator to detect the occurrence of a signal representing a data bit of a data word in the received signals, and a position processor is connected from the threshold detector for determining the time of reception and bearing of a signal representing a data bit of a data word.

The position processor may also include a memory for storing a table relating sound propagation time to receiver range and depth and providing a value representing a local speed of sound propagation through water for use by the position processor in converting the round trip propagation interval into a range between the communication and position determining units.

The communication and position determining device of the present invention may also use a multi-segment spherical directional receiving transducer having, for example, eight segments, in the receiving transducer assembly, rather than a horizontal hydrophone and a vertical hydrophone. In this implementation the transducer assembly will include, for each of a plurality of angles of rotation in three dimensions of a receiving pattern of the transducer wherein the totality of the rotated receiving patterns form the receiving pattern of the transducer, a combining network connected from selected segments of the spherical receiving transducer for generating a channel of omni, sine and cosine vector signals respectively representing the data word signals and the sine and cosine directional components of the data word signals received by the transducer at a corresponding angle of rotation of the receiving pattern.

The channel signals will then be passed through matched filters and, in this implementation, the signal processing unit may perform a pattern matching operation comparing the matched filter output signals of each segment channel with corresponding patterns for a set of pre-selected direction vectors and providing as an output a selected one of the set of pre-selected direction vectors which best corresponds to the received vector signals wherein the selected one of the set of pre-selected direction vectors represents in angle of reception in three dimensions of the data word received from the other communication and position determining unit.

In addition, the signal preprocessor will include, for each channel, a preprocessing channel for each of the channel signals, wherein each preprocessing channel includes a bandpass filter connected from a corresponding one of the omni, sine and cosine signals and having a bandwidth determined by the total bandwidth of the frequency bands, an analog to digital converter connected from the bandpass filter to convert the corresponding one of the filtered channel signals into a digital time domain representation of the corresponding one of the filtered channel signals, and a received signal sample memory connected from the analog to digital filter for storing time sequential samples of the corresponding one of the filtered channel signals. A multiplexer will be connected from the received signal sample memories for sequentially providing the stored time sequential samples of the filtered signals to the signal processing unit.

Alternatively, the communication and position determining device of the present invention may employ a multi-segment, three dimensional spherical receiving transducer with the bearing determining mechanisms previously described rather than the pattern matching algorithm. In this implementation, the combining network will a generate a channel signal for each angle of rotation of the receiving pattern wherein each channel signal represents the signal received by the transducer at a corresponding angle of rotation of the receiving pattern. The signal preprocessor will, in turn, have a preprocessing channel for each of the channel signals. Each preprocessing channel will include a bandpass filter connected from a corresponding one of the omni, sine and cosine signals wherein the filter bandwidth is determined by the total bandwidth of the frequency bands, and an analog to digital converter connected from the bandpass filter to convert the corresponding one of the filtered channel signals into a digital time domain representation of the corresponding one of the filtered signals, and a received signal sample memory connected from the analog to digital filter for storing time sequential samples of the corresponding one of the filtered channel signals. Again, a multiplexer will be connected from the received signal sample memories for sequentially providing the stored time sequential samples of the filtered channel signals to the signal processing unit.

Other features, objects and advantages of the present invention will be understood by those of ordinary skill in the relevant arts after reading the following descriptions of a presently preferred embodiment of the present invention, and after examination of the drawings, wherein:

DESCRIPTION OF A PRESENTLY PREFERRED EMBODIMENT

The underwater position determining and communication system of the present invention provides a solution to the above described problems of the prior art by utilizing a unique signal encoding to prevent intersymbol interference between the data bits of a block of data transmitted in a single transmission and to prevent intersymbol interference between the data bits of successive data blocks transmitted in successive transmissions. The communications waveforms are further selected for use in position determination to allow the accurate determination of the time of arrive of a signal. The following will first present general descriptions and discussions of aspects of the present invention for communications and for position determination, in that order, and will then describe an apparatus embodying and implementing the present invention.

A. General Description of the Communication System

The following will first consider the communication of data between a transmitting unit and a receiving unit and, for purposes of the following description, it is assumed that the data bits are formatted into data blocks and that a transmission from a transmitting unit to a receiving unit is comprised of a sequence of one or more data.

Figure 1:
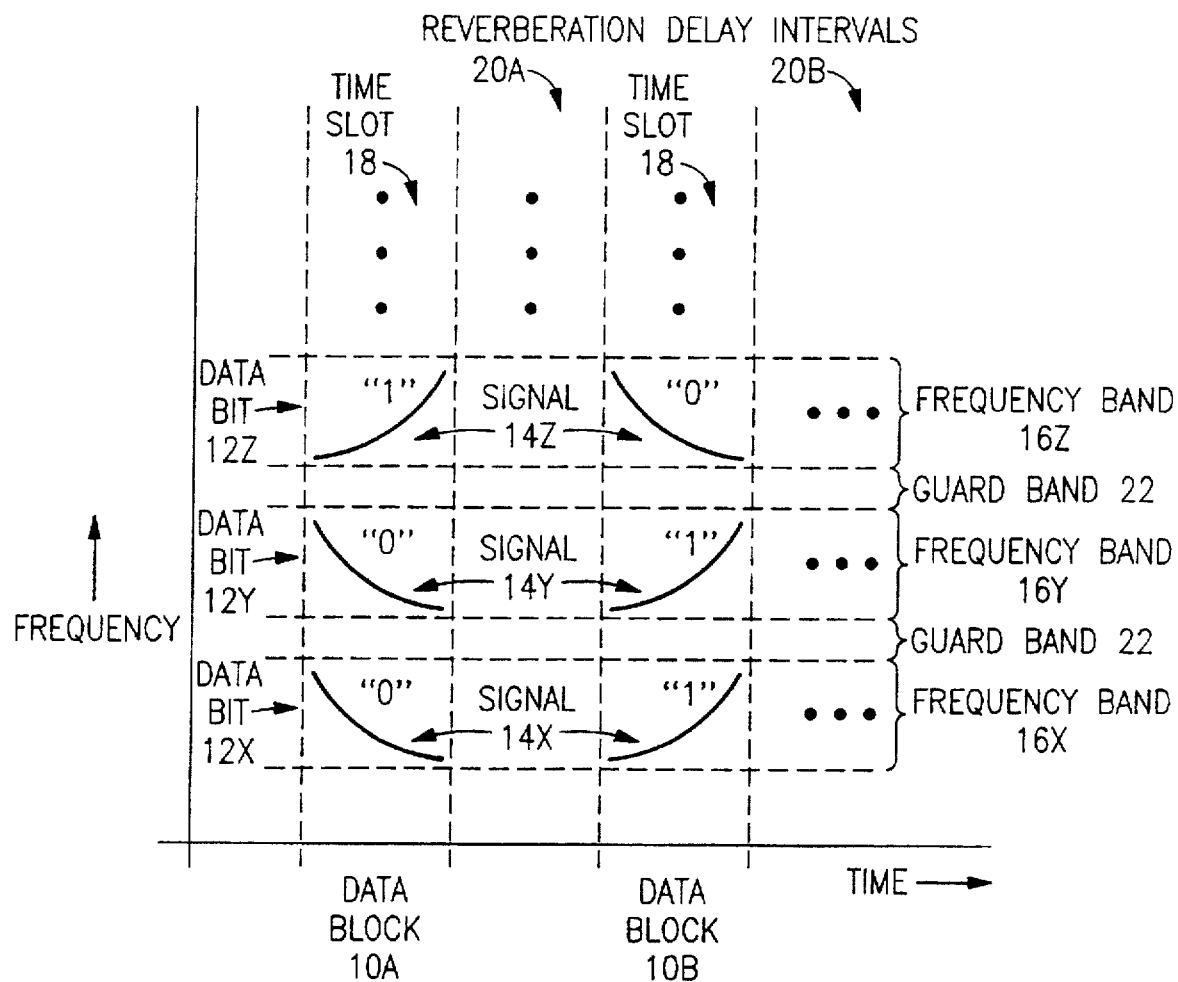
FIG. 1 is a diagrammatic representing of data encoding and transmission according to the present invention.

Referring to FIG. 1, therein is illustrated the data encoding and transmission method of the present invention for a transmission of two or more data blocks in sequence, respectively designated as Data Blocks 10A and 10B, and so on, each containing a plurality of bits of data, respectively designated as Data Bits 12X, 12Y and 12Z, and so on, wherein Data Block 10A contains Data Bits 12X, 12Y and 12Z representing the data bits 001 and Data Block 10B contains Data Bits 12X, 12Y and 12Z representing the data bits 110.

As illustrated in FIG. 1, the Data Bits 12 of each Data Block 10 are encoded and transmitted as the parallel, simultaneous transmission of multiple Signals 14, respectively designated as Signals 14X, 14Y and 14Z, wherein each signal represents a corresponding Data Bit 12 of the Data Block 10 and occupies a separate and distinct Frequency Band 16, respectively designated as Frequency Bands 16X, 16Y and 16Z. As also shown, each Data Block 10 is transmitted in a separate Time Slot 18, respectively designated as Time Slots 18A and 18B, and so on, separated in time by Reverberation Delay Intervals 20A, 20B and so on.

The use of a separate Frequency Band 16 for the transmission of each Data Bit 12 thereby, because of frequency separation, prevents interference between the Signals 14 representing the individual Data Bits 12 of the Data Block 10, thereby preventing intersymbol interference between the Data Bits 10 of a Data Block 10. It will be appreciated by those of ordinary skill in the relevant arts that the number of Data Bits 12 in each Data Block 10 may be increased by the allocation of an additional Frequency Band 16 for each Data Bit 12, thereby allowing an increased data rate and, since each Data Block 10 may be used to encode a unit identification or a predetermined message, a greater number of units to communicate and a greater number of predetermined messages.

There are, however, physical and economic constraints on the number of Frequency Bands 16 that may be implemented, and accordingly on the maximum number of bits in each Data Block 10. For example, each Frequency Band 16 must have sufficient bandwidth for the Signal 14 encoding chosen to implement the communication system; for example, frequency modulation encoding will require greater bandwidths than will phase modulation encoding. In addition, Frequency Bands 16 must be separated by Guard Bands 22 sufficient to avoid interference between the individual Signals 14 due, for example, to doppler effects if either or both of the transmitting and receiving units are in relative motion, or to phase/frequency shifts arising from the propagation characteristics of the medium.

Further constraints are imposed by the bandwidths of the acoustic transducers used to transmit and receive Signals 14 as, as is well known and understood, each acoustic transducer has an effective bandwidth determined by the design, dimensions and materials of the transducers, which will be described further in a following discussion.

In addition, the medium itself, that is, the water, may further constrain the effective total bandwidth of the Frequency Bands 16 because the propagation characteristics of water are not uniform and linear. For example, lower frequencies are generally propagated with less attenuation than are higher frequencies while the use of higher frequencies may allow the angle of reception of the Signals 14 to be determined more precisely than will lower frequencies.

Also, and in order to simplify the circuits required for reception and detection of the Signals 14, it is generally preferable that no Frequency Band 16 include a frequency that is a harmonic of a frequency in a lower Frequency Band 16.

Lastly, and as will be described further below, the Signal 14 in each Frequency Band 16 requires a corresponding individual processing channel in the receiving unit, so that an increase in the number of Frequency Bands 16 increases the complexity, size and cost of the transmitting and receiving units.

A presently preferred embodiment of the invention is therefore implemented with ten Frequency Bands 16, thereby allowing ten Signals 14 to encode ten Data Bits 12 in each Data Block 10. In this implementation, Frequency Bands 16 lie in the range of 26 KHz to 30 KHz with each Frequency Band 16 being, for example, 300 Hz wide, and spaced evenly across the 26 KHz to 30 KHz band. Guard Bands 22 occupy the frequency ranges between Frequency Bands 16 and, in this implementation, are nearly 10 KHz wide. It has been found, however, that Guard Bands 22 of 10 Hz to 100 Hz width are generally sufficient, so that the 26 KHz to 30 KHz band can contain more than ten Frequency Bands 16, thereby allowing each Data Block 10 to be encoded by more than ten Signals 14.

It will be appreciated by those of ordinary skill in the relevant arts, however, that a system implemented with ten Signals 14 in each Data Block 10, that is, ten data bits per data word, is not limited to a total of only $2^{10}$ (1024) different unit identifications or messages. For example, and as illustrated in FIG. 1, Data Blocks 10 may be sequence encoded wherein the meaning attached to a given data block is dependent upon both its content, that is, the combination of data bit values therein, and its position in a sequence of data blocks. For example, a transmission may be comprised of a first Data Block 10 containing an identification of the transmitting unit, a second Data Block 10 containing a predetermined message or an identification of the intended receiving unit, a third Data Block 10 containing a predetermined message, and so on, thereby allowing up to eight transmitting and receiving units and eight or more predetermined messages. It will be apparent that the number of different predetermined messages can be increased by the use of multiple data blocks for each message or unit identification, so that, for example, the number of possible messages would increase from eight to sixty-four by the use of two data blocks for each message.

The total number of different meanings that may be attached to each data block may also be increased by increasing the number of Data Bits 12, that is, the number of Frequency Bands 16 and Signals 14, in each Data Block 10. As described above, the 26 KHz to 30 KHz band has sufficient bandwidth to accommodate at least 6 Frequency Bands 16, each having a Signal 14, so that each Data Word 10 could encode up to 6 Data Bits 12 so that 256 different meanings could be assigned to each Data Word 10.

Next considering intersymbol interference between successive Data Blocks 10 of a transmission, it has been described above that each Data Block 10 is transmitted in a separate Time Slot 18 and that Time Slots 18 are separated in time by Reverberation Delay Intervals 20. The width of Time Slots 18 is determined by the method of encoding Data Bits 12 as Signals 14 and, and discussed below, in a presently preferred implementation of the invention are on the order of 100 milliseconds, while the width of Reverberation Delay Intervals 20 is determined by propagation characteristics of the environment or region in which the units are operating.

According to the present invention, intersymbol interference between the Signals 14 of successive Data Blocks 10 is avoided by making Reverberation Delay Intervals 20 at least equal to or greater than the known or expected maximum time delay difference along the currently occurring or expected multiple propagation paths, the maximum multiple propagation path time delay being referred to as the "multipath reverberation time". As such, the Signals 14 of each Data Block 10 transmission will have been completely received and detected by the receiving unit before the start of reception and detection of the Signals 14 of a next Data Block 10 transmission, thereby avoiding intersymbol interference between the Signals 14 of successive Data Blocks 10.

It is known from both historical data and mathematical models of sound propagation in the ocean that the maximum multiple propagation path time delay over the anticipated ranges of interest, for example, 1 to 5 nautical miles, and in the frequency bands of interest of 25 KHz to 30 KHz, can be as high as 5 to 10 seconds. In general, however, and using, for example, swept hyperbolic frequency modulated waveforms and replica correlation signal detection, Reverberation Delay Intervals 20 on the order of 100 milliseconds have been found to provide acceptable results.

As indicated above, Reverberation Delay Intervals 20 may be predetermined and stored in the transmitting and receiving units to control the timing of successive transmissions of Data Blocks 10, for example, by calculation from a mathematical model and historic data representing the anticipated area of underwater operations, or may be set at a predetermined maximum value known or anticipated to be satisfactory for all areas. In an alternative embodiment, Reverberation Delay Intervals 20 may be determined by measurement in the actual area of operation by an exchange between units of calibration data blocks having the maximum potential bandwidth, using a maximum predetermined Reverberation Delay Interval 20, and measurement of the actual width, in time, of the received data blocks. Alternatively, and since the Data Bit 12 patterns of the identification codes for at least two units are known, that is, transmitting/receiving pair, the unit identification codes may be used for the calibration data blocks to an acceptable level of accuracy in measuring the reverberation delay between the units.

Finally, it will be noted in FIG. 1 that Signals 14 are illustrated therein as encoding Data Bits 12 as nonlinear frequency modulated (FM) signals, such as hyperbolic FM signals, wherein an up sweeping FM signal represents a Data Bit 12 having a value of 1 and a down sweeping FM signal represents a Data Bit 12 having a value of 0.

According to the present invention, any pair of fade resistant Signal 14 waveforms that can be appropriately discriminated from one another may be used for purposes of communication between units, such as orthogonal pseudo-noise sequences, pulsed phase modulated carriers, or binary frequency shift keyed signals wherein, for example, an up-down sweep represents a "1" and a down-up sweep represents a "0". Yet other possible Signal 14 waveforms will be well known and understood by those of ordinary skill in the relevant arts.

It must be noted, however, as will be discussed in a following description of position determination, that Signals 14 are also used to determine the relative positions of two units with respect to one another and that the waveforms of Signals 14 are therefore preferably selected to meet position location requirements as well as communications requirements. In particular, each transmission by a given unit will be comprised, at the minimum, of at least a single Data Block 10 containing that unit's identification code, and may include additional Data Blocks 10 containing, for example, encoded messages and additional information, such as the present depth of the transmitting unit. Each Data Block 10, in turn and as described above, is comprised of a plurality of Data Bits 12 encoded and transmitted concurrently and in parallel as a plurality of corresponding Signals 14 occupying corresponding Frequency Bands 16.

As will be discussed in the following, in a presently preferred embodiment the units of the present invention operate as a range and bearing transponder system wherein the position of one unit with respect to another is determined as a function of the relative bearing of the units with respect to one another and of the range or distance between the units, which is determined from the round trip signal propagation time between the units. The operation of the units as a range and bearing transponder system thereby requires only that the transmissions between the units contain a single signal having characteristics allowing the bearing and time of reception of the signal to be determined with sufficient accuracy. As such, and as implemented in a presently preferred embodiment of the units, a single one of Signals 14 may be used for purposes of determining the bearing and range between any pair of units.

As will also be described further below, the units also operate secondarily as a passive bearing/range rate tracking system, and include the capability of operating as a hyperbolic or cross bearing system, so that, in the preferred mode of positioning determination, only a single receiving unit is required to determine the location of a transmitting unit.

As indicated above, the accuracy of the system in determining the relative positions of the units is determined by the accuracy of the system in determining the bearing and range of one unit with respect to the other. As the accuracy of the units in determining the bearings of received signals is primarily determined by the characteristics of the receiving transducers, or hydrophones, the accuracy of the system is therefore essentially a function of the system's accuracy in measuring time of arrival of the navigation signals. The inherent accuracy of the system in measuring time of arrival of the navigation signal, in turn, is affected by the signal's bandwidth, but not explicitly by the signal's pulse width. In the instance of pulsed continuous wave (CW) sinusoidal waveforms, for example, the bandwidth is the reciprocal of the pulse length, so that long continuous wave pulses will provide reduced range measurement accuracy. In the case of FM waveforms, however, the bandwidth and pulse length are essentially independent of one another. By using long FM pulses, therefore, significant processing gain against noise that is proportional to the pulse length can be retained without reducing the range accuracy that can be obtained with a large signal bandwidth.

Long pulse length FM waveforms and other similar waveforms, however, are inherently ambiguous as regards time and frequency, that is, doppler shifts. In the instance of linear swept FM waveforms, for example, each data bit must be represented by a pair of up/down or down/up swept FM waveforms, referred to as binary swept FM and wherein the up/down and down/up sweeps may respectively represent, for example, logic 0 and logic 1, to resolve the ambiguity between doppler shift and time difference in the received waveform and thereby achieve the desired time/range resolution.

Other FM waveforms are available for use that have less ambiguity between time/range resolution and frequency/ doppler resolution, however, and are well known to those of ordinary skill in the relevant arts. For example, the hyperbolic FM waveform can be generated to have a nearly ideal "thumbtack" ambiguity function between time and frequency, that is, doppler shift, and is more sensitive to doppler shift than is the linearly swept FM waveform. Although a presently preferred embodiment of the present invention uses the hyperbolic waveform, it must be noted that the system also uses replica correlation in detecting the received signal, as will be described further below. There is therefore a tradeoff decision to be made between using, for example, a binary swept FM waveform that is more doppler tolerant and which requires the generation of only one replica waveform for each Signal 14 and the hyperbolic FM waveform which is more doppler sensitive but requires a number of waveform replicas for each Signal 14.

B. General Description of the Position Determining System

As has been discussed above, in a presently preferred embodiment of the present invention the units operate as a range and bearing transponder position determination and secondarily as a passive bearing/range rate tracking system but include the capability of operating as a hyperbolic or cross bearing system.

1. General Operation Of The System As A Range And Bearing Transponder System

Figure 2:
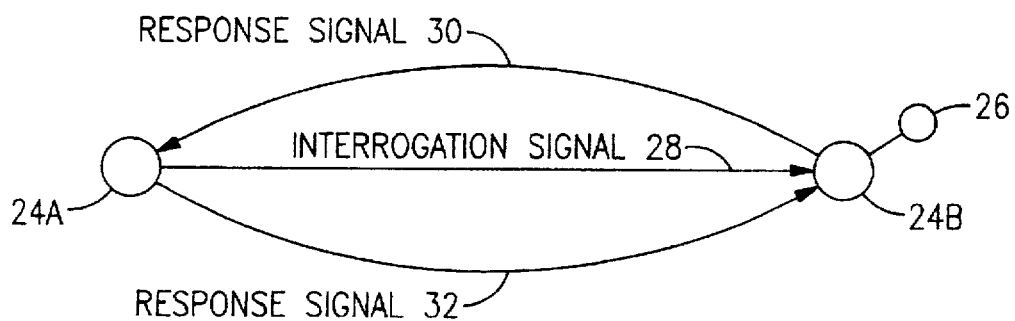
FIG. 2 is a diagrammatic representation of a presently preferred embodiment of an under water communication and navigation system employing the communication and position determining units of the present invention.

A diagrammatic representation of the presently preferred embodiment of an under water communication and navigation system employing the Communication/Position Units 24 of the present invention is illustrated in FIG. 2 wherein it is shown that a basic system configuration includes a first Communication/Position Unit 24A and a second Communication/Position Unit 24B. It is assumed that in most configurations at least one of Communication/Position Units 24A and 24B, such as Communication/Position Unit 24B, is stationary while Communication/Position Unit 24A is mobile.

For example, Communication/Position Unit 24B may be mounted on a surface support craft, a support submersible, or an underwater base or station while Communication/ Position Unit 24A is carried by a diver or a submersible. In this regard, it is anticipated that at least those Communication/Position Units 24 that are carried by divers are constructed as hand held or "backpack" units, while those of ordinary skill in the relevant arts will realize is practical given modern microcircuits and microprocessors. Others of Communication/Position Units 24, such as those mounted on a surface craft or a submersible, may be constructed as desk or rack mounted units containing the electronics of the unit and an externally mounted transducer unit connected to the electronics unit by a cable.

It is also anticipated that in certain uses the location of the stationary Communication/Position Unit 24B is accurately known, for example, by being located at a known surveyed site or by being provided with accurate location information from, for example, a navigation satellite based Global Positioning System (GPS) such as those in common use and indicated in FIG. 2 as GPS 26. In many uses or situations, however, accurate knowledge of the geophysical positions of the Communication/Position Units 24 is not necessary and relative position information between the units is adequate, so that a GPS 26, or equivalent geophysical location information, is not necessary.

It will also be recognized that while the basic system is comprised of a pair of Communication/Position Units 24, a system may include as many Communication/Position Units 24 as may be separately identified by the unit identification codes and that these units may be comprised of any combination of fixed and mobile units.

It will also be recognized that it is not necessary for even one of the Communication/Position Units 24 in a system be stationary, and that all of the Communication/Position Units 24 in a system may be mobile, even in a system having a single pair of Communication/Position Units 24, such as a two diver system. In a system comprised entirely of mobile Communication/Position Units 24, however, the positions of the units may be determined relative only to one another unless at least one of the units is provided with an associated portable geophysical positioning system, such as a GPS 26, all of which generally require an above surface antenna.

Referring again to FIG. 2, as has been described, a basic range and bearing transponder position location system requires only an interrogating Communication/Position Unit 24, such as Communication/Position Unit 24A, and a responding Communication/Position Unit 24, such as Communication/Position Unit 24B. Communication/

Position Unit 24A transmits an Interrogation Signal 28 to Communication/Position Unit 24B, which responds by transmitting a Response Signal 30 back to Communication/Position Unit 24A. Communication/Position Unit 24A may then determines the position of Communication/Position Unit 24B with respect to Communication/Position Unit 24A by measuring the angle of reception, or bearing, of the Response Signal 30 at Communication/Position Unit 24A and the distance, or range, to Communication/Position Unit 24B as function of the round trip transmission time between the units.

It will be understood that the operation of the system and Communication/Position Units 24 as just described determines the position of one unit with respect to another unit, so that only one unit obtains position information. In the presently preferred embodiment, however, and as illustrated in FIG. 2, each Communication/Position Unit 24 of a pair of Communication/Position Units 24 determines the relative position of the other Communication/Position Unit 24 of the pair by means of a second Response Signal 32 that is transmitted from Communication/Position Unit 24A to Communication/Position Unit 24B in response to the reception of Response Signal 30 from Communication/Position Unit 24B. Communication/Position Unit 24B thereby receives the original Interrogation Signal 28 and second Response Signal 32, separated in time by the round trip transmission time between Communication/Position Unit 24A and Communication/Position Unit 24B and may determine the position of Communication/Position Unit 24A relative to itself from the angle of reception, or bearing, of the second Response Signal 32 at Communication/Position Unit 24B and the distance, or range, to Communication/Position Unit 24A as function of the round trip transmission time between the units.

In this regard, it will be recognized by those of ordinary skill in the arts that the above described "round trip transmission time" will include a processing delay in the responding unit. This processing delay, however, will be known and constant, and can therefore be corrected or compensated for in determining the actual "round trip transmission time" between the units, for example, by programming an expected maximum processing time into the scheduling of each response transmission.

It will also be recognized that the operation of the system as just described may be reversed, that is, that either of Communication/Position Units 24A and 24B may be the original interrogating unit and that either unit may be a mobile or stationary unit, or that both units may be mobile.

Lastly with regard to the above, it has been described above that a single one of Signals 14 may be used for purposes of determining the bearing and range between any pair of units operating as a range and bearing position determining system. As such, it will be understood that any Data Word 10, such as a Data Word 10 conveying a unit's identification, may operate as an interrogation Data Word 10, a first response Data Word 10 or a second response Data Word 10 wherein a single one of the plurality of Signals 14 in the Data Words 10 is used as the Interrogation Signal 28, a First Response Signal 30 or a Second Response Signal 32. In the alternative, a different Signal 14 may be used in each of the Data Words 10 to comprise the Interrogation Signal 28, the First Response Signal 30 and the Second Response Signal 32, so long as the difference between the frequencies of the Signals 14 used as such is not so great that the velocities of propagation of the different Signals 14 differ sufficiently to introduce errors in determining the times of reception of the Signals 14.

Finally, it must be noted from the above description of a presently preferred embodiment of the invention, and from the following discussions of alternate embodiments, that it is preferable and in some instances necessary to schedule the transmissions by the various that Communication/Position Units 24 comprising a communications and position determining system. For example, the scheduling of transmissions will avoid interference between transmissions, will save power by allowing the units to go to a standby mode when transmissions are not scheduled, and will allow the multiple use of unit identifications by assigning units scheduled time slots. For this reason, each Communication/Position Unit 24 will include a scheduling clock and counters and the scheduling counters of the Communication/Position Units 24 are periodically resynchronized by a master synchronization transmission from a Communication/Position Unit 24 selected as a master unit. In this embodiment, the scheduling clock and counter in each Communication/Position Unit 24 "wakes up" the Communication/Position Unit 24 at some predetermined interval before the master synchronization transmission from the master Communication/Position Unit 24 is expected, and the operation of the Communication/Position Unit 24 is resynchronized with the master Communication/Position Unit 24 when the master synchronization transmission is detected.

2. Alternate Modes of Operation

It has been described above that Communication/Position Units 24 secondarily operates as a passive bearing/range rate tracking system, and includes the capability of operating as a hyperbolic or cross bearing system. The operation of Communication/Position Units 24 as a passive bearing/range rate tracking system may be readily understood with the aid of FIG. 2 and the above discussions. In this mode, however, and after an initial determination of the position of a Communication/Position Unit 24A with respect to a Communication/Position Units 24B, or the reverse, for example, by starting both units from known locations or by operation of the system as described above. Thereafter, only Communication/Position Unit 24A continues to transmit and transmits a Signal 34, which may be similar to or the same as any of Signals 28, 30 or 32, wherein the transmissions may be continuous or at known intervals, depending upon the anticipated rate of movement of Communication/Position Unit 24A.

As described above with respect to operation of the units in transponder mode, Communication/Position Unit 24B receives Signal 34 and determines the bearing of Communication/Position Unit 24A relative to Communication/Position Unit 24B from the angle of reception of Signal 34. In operation as a passive bearing/range rate tracking system, however, Communication/Position Unit 24B extracts doppler information from Signal 34 wherein the doppler information represents the rate of motion of Communication/Position Unit 24A with respect to Communication/Position Unit 24B, as is well known and understood. From the bearing and rate of motion information extracted from each transmission of Signal 34, therefore, Communication/Position Unit 24B may calculate and track the movement of Communication/Position Unit 24A, starting from the initial starting position with respect to Communication/Position Unit 24B and thereby tracking and determining the current position of Communication/Position Unit 24A with respect to Communication/Position Unit 24A.

Figure 3:
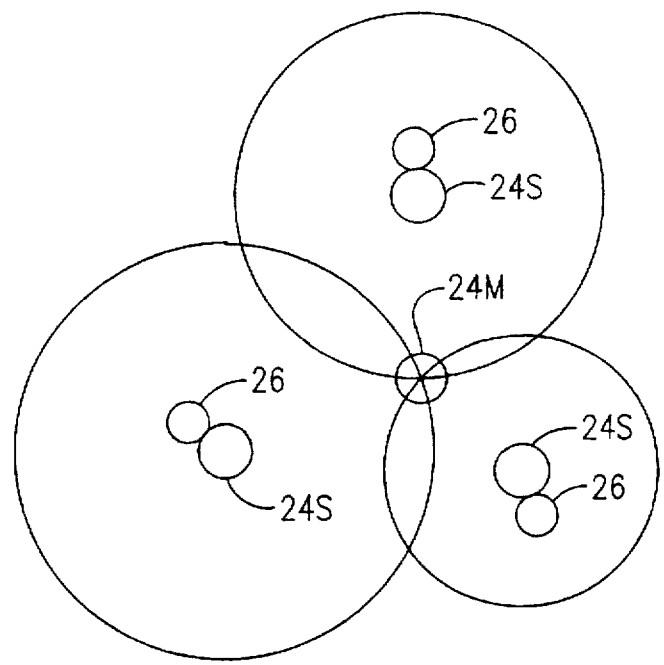
FIG. 3 is a diagrammatic representation of the present invention implemented as a hyperbolic position determining system.
Figure 4:
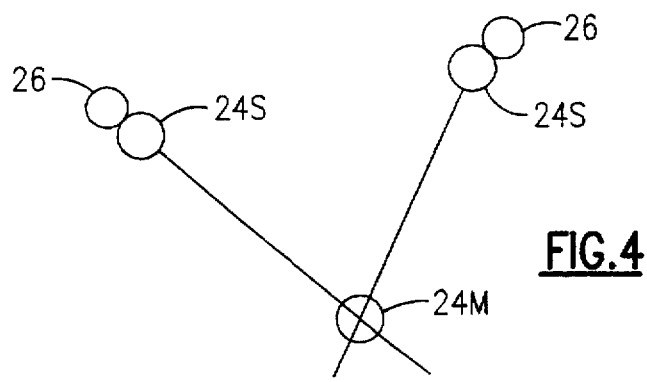
FIG. 4 is a diagrammatic representation of the present invention implemented as a cross bearing position determining system.

The operation of Communication/Position Units 24 in a hyperbolic or cross bearing system is illustrated in FIGS. 3 and 4 respectively. As shown in FIG. 3, and as is understood by those of ordinary skill in the arts, the use of Communication/Position Units 24 in a hyperbolic position determination system requires at least three stationary Communication/Position Units 24S, the locations of which are known accurately, for example, by placing the units at previously surveyed sites or by associating a GPS 26 with each unit, at least at the initial positioning of the units.

Operation as a hyperbolic position determining system also requires an accurate time clock at each of Communication/Position Units 24S, such as the clock available in a GPS 26, to control the time of each transmission at each of Communication/Position Units 24S so that the Communication/Position Units 24S transmit their signals in synchronization. As is well known and understood by those of ordinary skill in the relevant arts, the position of a mobile Communication/Position Unit 24M can then be determined by the Communication/Position Units 24M by measuring the difference in the times of arrival of the signals from Communication/Position Units 24S.

Further, it has been described above that Communication/Position Units 24 preferably use one or more of Signals 14 as the transmitted signal for position determining purposes and that, for this reason, the waveform of Signals 14 is preferably selected to be used for both communications and position determination. Certain embodiments of a hyperbolic position determination system may use a different one of Signals 14 for each of Communication/Position Units 24S, that is, a different frequency band for each of Communication/Position Units 24S, thereby effectively frequency coding the Communication/Position Units 24S. It may be preferable, however, to use only a single Signal 14 for all Communication/Position Units 24S due to possible errors introduced by frequency dependent differences in the velocity propagation of sound in the medium, and due to possible processing errors in determining and comparing the times of arrival of signals having different frequencies. The same considerations may also apply in the construction of the preferred embodiment of the present invention as a range and bearing transponder system.

Referring to FIG. 4, as shown therein and as well understood by those of skill in the arts, the operation of Communication/Position Units 24 in a cross bearing system requires at least two stationary Communication/Position Units 24S, the locations of which are known accurately, for example, by placing the units at previously surveyed sites or by associating a GPS 26 with each unit, at least at the initial positioning of the units.

It is well understood that, in a cross bearing position determining system, only the bearings of the signals received by mobile Communication/Position Unit 24M from mobile Communication/Position Units 24S are of significance in determining the position of Communication/Position Unit 24M relative to Communication/Position Units 24S. As such, the times of arrival of the signals and the relative times of transmission of the signals are not critical, except to the extent necessary to avoid interference between the signals as received. Operation as a cross bearing position determining system, therefore, does not require accurate time measurement by Communication/Position Units 24S, or an accurate clock source, such as a GPS 26, at each Communication/Position Units 24S. In a cross bearing system, for example, the transmissions by one of the Communication/Position Units 24S may be used to control the trigger the transmissions by the other Communication/Position Units 24S.

Again, certain embodiments of a cross bearing position determination system may use a different Signal 14 for each of Communication/Position Units 24S, that is, a different frequency band for each of Communication/Position Units 24S, thereby effectively frequency coding the Communication/Position Units 24S. In this instance, however, and because the position of a Communication/Position Units 24S with respect to the Communication/Position Units 24S are a function only of the bearings of the received signals from the Communication/Position Units 24S, the use of different frequencies for each of the signals will not introduce additional errors.

3. General Description of Range Determination in the Preferred Embodiment as a Range and Bearing Transponder System It will be apparent to those of ordinary skill in the relevant arts that the accuracy of a position determination system according to the present invention and as embodied as a range and bearing transponder system is dependent upon the accuracy with which Communication/Position Units 24 determine the bearings and ranges to other Communication/Position Units 24. It is also apparent that the accuracy with which Communication/Position Units 24 determine the bearings of the received signals is determined largely by the characteristics of the receiving transducers and the initial amplification and signal combining circuits, which will be discussed in a following description.

The accuracy with which Communication/Position Units 24 determine the ranges to others of the Communication/Position Units 24, however, is dependent upon accurate time of arrival measurements, which requires accurate waveform and detection processing, and the conversion of time delay measurements to ranges, which in turn requires a propagation model in order to convert time of arrival into range.

In the presently preferred embodiment of Communication/Position Units 24, the fundamental technique used for signal detection is replica correlation, which is alternately referred to as matched filtering. Replica correlation allows time of arrival measurement as well, through determination of the time when the peak in the detected matched filter output occurs.

Figure 5:
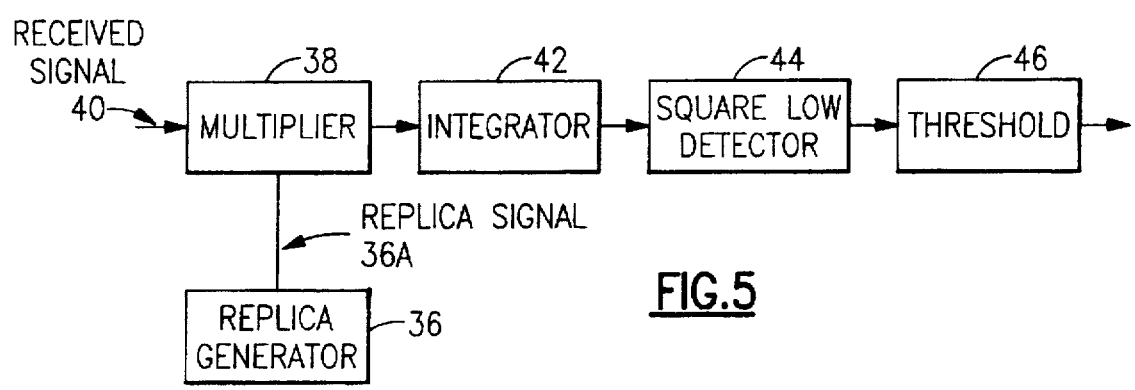
FIG. 5 is a block diagram illustrating the fundamental replica correlation process.

FIG. 5 is a block diagram illustrating the fundamental replica correlation process which, followed by square-law detection and thresholding, produces optimum signal detection when any interfering noise signal is white Gaussian noise and when the received signal is expected to be exactly the same as the replica, except for an amplitude factor and a time delay associated with propagation of the signal. As illustrated therein, the basic signal detection mechanism includes a Replica Generator 36 for generating a Replica Signal 38A identical to the signal to be detected, a Multiplier 38 for correlating (multiplying) Received Signal 40 and Replica Signal 38A and an Integrator 42 for integrating the correlated output of Multiplier 38. Multiplier 38 is then followed by a Square Law Detector 44, which is followed by a Threshold 46 generating an output indicating the detection of Received Signal 40.

Figure 6:
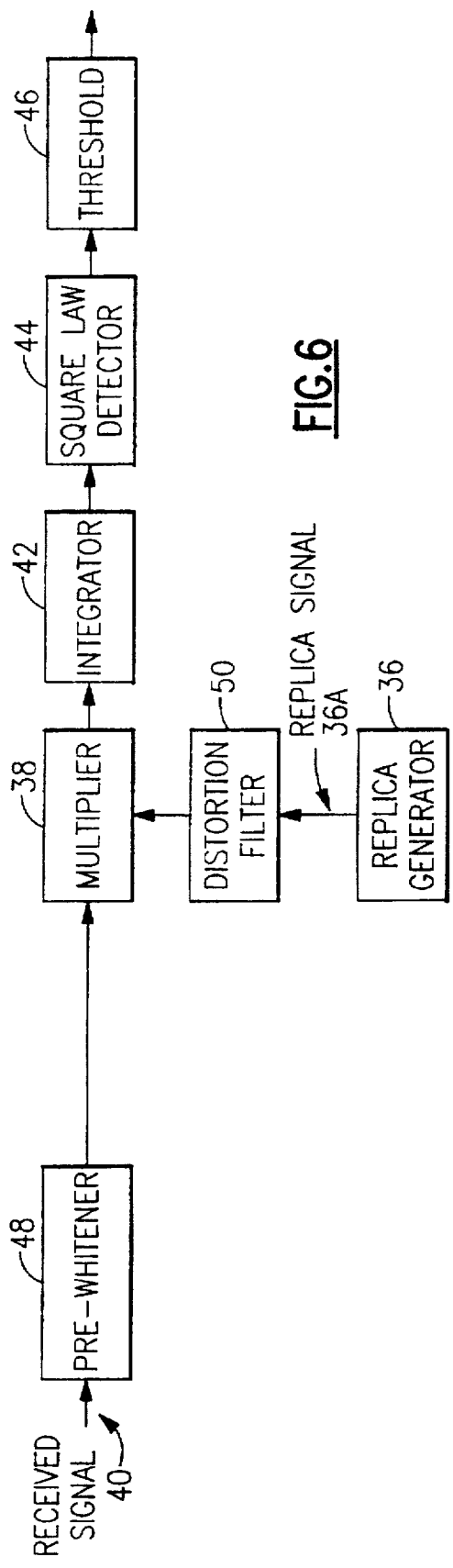
FIGS. 6 and 7 are block diagrams of further implementations of the replica correlation process.
Figure 7:
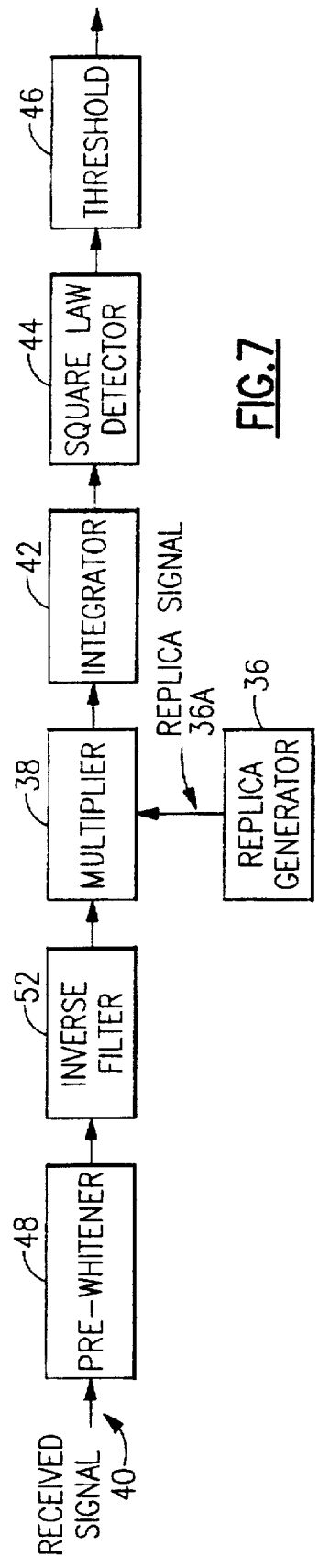

As illustrated in FIGS. 6 and 7, the replica correlation mechanism shown in FIG. 5 can be further adapted to more general cases of replica correlation, often referred to as "matched filtering", by compensating for a non-white noise with a noise "Pre-whitener" 48, and filtering of either Replica Signal 38A or Received Signal 40 to compensate for distortion effects. Either a Distortion Filter 50, which adjusts Replica Signal 38A for known or estimated distortion effects appearing in Received Signal 40, or an Inverse Filter 52, which removes such effects from Received Signal 38 can be applied.

It will be apparent that the degree and type of distortion effects must be known in order to be implemented and corrected or compensated for in a Distortion Filter 50 or an Inverse Filter 52. The degree and type of distortion effect may be estimated or modeled from knowledge of the medium and context in which the system will be operating, or the identification code of one or more of the Communication/Position Units 24 will be known a priori, and may therefore be used as channel calibration signals to measure or estimate distortion effects.

Given that a form of matched filter is used to detect the signal, the accuracy which can be achieved in measuring time delay is a function of the signal design and the signal to noise ratio at the output of the matched filter. The root-mean-square time delay accuracy dT (standard deviation of time delay error) is given by the formula $$dT = [B(2E/N0)^{1/2}]^{-1}$$

where E/N0 is the signal to noise ratio at the output of the matched filter and B is the effective signal bandwidth.

It will be seen therefore that the inherent accuracy of the system in measuring time of arrival of the navigation signal, in turn, is affected by the signal's bandwidth, but not explicitly by the signal's pulse width. In the instance of pulsed continuous wave (CW) sinusoidal waveforms, for example, the bandwidth is the reciprocal of the pulse length, so that long continuous wave pulses will provide reduced range measurement accuracy. In the case of FM waveforms, however, the bandwidth and pulse length are essentially independent of one another. By using long FM pulses, therefore, significant processing gain against noise that is proportional to the pulse length can be retained without reducing the range accuracy that can be obtained with a large signal bandwidth.

Long pulse length FM waveforms and other similar waveforms, however, are inherently ambiguous as regards time and frequency, that is, doppler shifts. In the instance of linear swept FM waveforms, for example, each data bit must be represented by a pair of up/down or down/up swept FM waveforms, referred to as binary swept FM and wherein the up/down and down/up sweeps may respectively represent, for example, logic 0 and logic 1, to resolve the ambiguity between doppler shift and time difference in the received waveform and thereby achieve the desired time/range resolution.

Other FM waveforms are available for use that have less ambiguity between time/range resolution and frequency/doppler resolution, however, and are well known to those of ordinary skill in the relevant arts. For example, the hyperbolic FM waveform can be generated to have a nearly ideal "thumbtack" ambiguity function between time and frequency, that is, doppler shift, and is more sensitive to doppler shift than is the linearly swept FM waveform. Although a presently preferred embodiment of the present invention uses the hyperbolic waveform, it must be noted that the system also uses replica correlation in detecting the received signal, as will be described further below. There is therefore a tradeoff decision to be made between using, for example, a binary swept FM waveform that is more doppler tolerant and which requires the generation of only one replica waveform for each Signal 14 and the hyperbolic FM waveform which is more doppler sensitive but requires a number of waveform replicas for each Signal 14.

It has been described above that the accuracy of the system in determining the range, or distance, between two Communication/Position Units 24 is also dependent upon the accuracy of the conversion of time delay measurements to ranges, which in turn requires a propagation model in order to convert time of arrival into range.

If the speed of sound in the medium were a constant (c), then the effective range error resulting from a one-way time delay, measurement error dT would be c dT. The signal, however, propagates through the medium over multiple paths, and therefore the conversion of time delay measurement to range is not entirely straightforward. A propagation model is necessary to convert time of arrival into range; several possible variations are possible. At the frequencies of interest (20–30 KHz), the use of ray tracing (eikonal approximation) is valid to determine time of arrival and relative amplitudes of signal along each propagation path. With the availability of digital bathymetric charts for the given operational area, bottom topography can be factored into this approach as well.

One or more tables can be generated from such a model to provide the one way time of arrival of the earliest signal arrival (path), vs. receiver range and depth, the one way time of arrival of the strongest signal arrival, vs. receiver range and depth, and the one way time of arrival of the centroid of the ray path arrivals, vs. receiver range and depth. Any of these time vs. range tables can be associated with the appropriate signal arrival parameter, or a combination of these can be used. Sound speed vs. depth information for the model can be either pre-stored for an area as a function of historical data, or measured at any Communication/Position Unit 24, or measured between any pair of Communication/Position Units 24 and transmitted to all other Communication/Position Units 24.

4. General Description of the Transducers

It must be noted with regard to the above discussions that the bearing, or angle of reception, of a signal is determined by use of a directional underwater microphone, that is, a directional multimode hydrophone, which uses, at a minimum, an orthogonal pair of horizontally disposed dipole receivers so that the dipole patterns are in the azimuthal plane, that is, the horizontal plane. In applications where the vertical bearing of a received signal is significant, for example, in determining the range between the units when the units are at sufficiently different depths, an additional orthogonal pair of vertically disposed dipole receivers may be added to the array, wherein the dipole patterns are in the vertical plane, to determine the vertical bearing of the received signal.

It is anticipated that in certain embodiments the directional multimode hydrophone array may be constructed as a free floating unit connected to the electronics unit by a cable and weighted to float in the desired orientation with respect to the horizontal plane. In other embodiments the hydrophone array may be built into a hand held unit, which would be visually oriented by the user, perhaps with the aid of a bubble level built into the unit. In yet other embodiments, the hydrophone assembly may be mounted, for example, to a surface craft or submersible, either in a rigid mount or in a self-orienting gimbal mount.

In still further embodiments the hydrophone assembly may include a 3-axis orientation sensor co-located with the hydrophone assembly to determine the orientation of the hydrophone assembly, and thus of the dipole patterns. The measured angle of arrival of a signal with respect to the hydrophone array can then be converted to absolute, earth oriented vertical and horizontal coordinates by normal geometric transformations.

It may also be advantageous to be able to directly determine the current depth of a Communication/Position Unit 24, for example, for transmission to a master Communication/Position Unit 24 which stores profiles of local sound transmission characteristics such as speed of propagation versus depth, as described above, which may then respond by communicating local speed of sound information to the Communication/Position Unit 24. In certain instances, the depth information may also be transmitted to other units for use in correcting or compensating range calculations when the units are at different depths, or when the Communication/Position Units 24 are being used, for example, to survey and map a locality. At least some of Communication/Position Units 24 may therefore also include a depth sensor, which may be associated with the transducer assembly.

Finally, it must be noted that each of Communication/Position Unit 24 transmits as well as receives signals and the receiving hydrophone arrays may also be used to transmit signals. The presently preferred embodiment of Communication/Position Units 24 utilizes a separate, omnidirectional transducer to transmit signals, however, because of the directional nature of the receiving hydrophone array and because the bearing to the intended receiving unit may not be known at the time of transmission.

In addition, and because the transmitting and receiving transducers are separate units, and because the receiving transducer and amplifiers will be designed to receive and amplify relatively low level signals, Communication/Position Units 24 will incorporate circuitry and controls for "blanking", or switching off, the receiving transducer and amplifiers when transmitting.

C. Detailed Description of the Communication and Range and Bearing Transponder Position Location System Referring to FIG. 8, therein is shown an implementation of the presently preferred embodiment of the present invention as Communication/Position Unit 24 operating as a simultaneous, parallel multi-signal communication system and a range and bearing transponder position location system. As indicated therein, a Communication/Position Unit 24 includes a Transducer/Sensor Assembly 54, a Signal Preprocessor 56, and a Processing/Control Unit 58.

Referring first to Transducer/Sensor Assembly 54, as described above a Communication/Position Unit 24 receives communication and navigation signals and the bearing, or angle of reception, of a signal is determined by use of a directional multimode hydrophone, comprised, at a minimum, an orthogonal pair of horizontally disposed dipole receivers with the dipole patterns in the azimuthal plane, that is, the horizontal plane, to determine the horizontal bearing of the received signal. This orthogonal pair of horizontally disposed receiving transducers, or hydrophones, is represented in FIG. 8 as Horizontal Directional Hydrophone 60.

Figure 8:
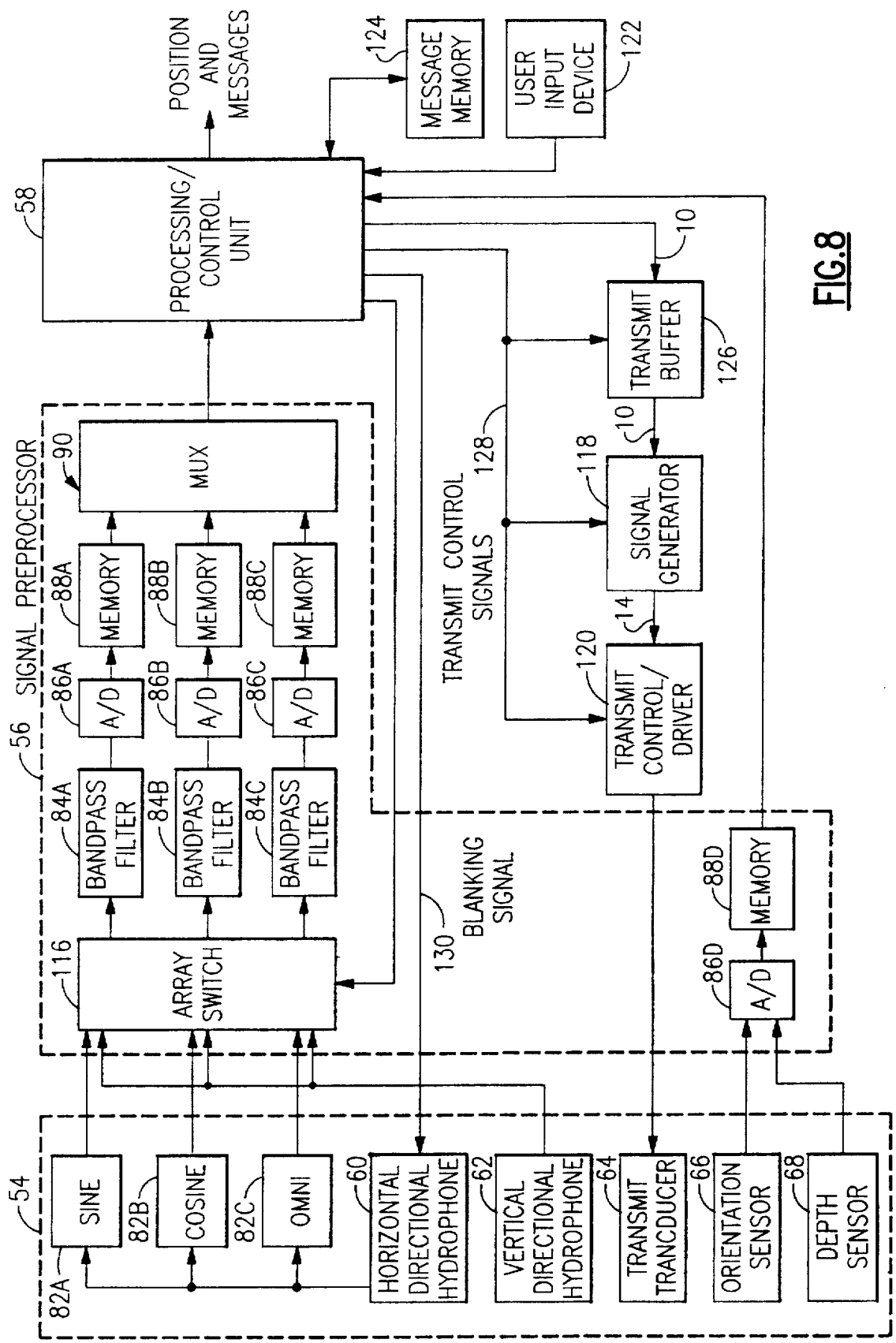
FIG. 8 is a block diagram of a communication and position determining unit of the present invention.

Transducer/Sensor Assembly 54 may also include an orthogonal pair of vertically disposed dipole receivers with the dipole patterns in the vertical plane, represented in FIG. 8 as Vertical Directional Hydrophone 62 to determine the vertical bearing of the received signal.

As also described, Transducer/Sensor Assembly 54 will include an omnidirectional transmitting transducer, represented in FIG. 8 as Transmit Transducer 64 and may include an Orientation Sensor 66 and a Depth Sensor 68, all as discussed above, wherein Depth Sensor 68 provides an output representing the present depth of Transducer/Sensor Assembly 54 and Orientation Sensor 66 detects and provides an output or outputs representing the orientation of Transducer/Sensor 54 and thus of Hydrophones 60 and 62 in the horizontal and vertical planes.

Orientation Sensor 66 may also include a compass or other geophysical orientation sensor to determine and indicate the geophysical orientation of Horizontal Directional Hydrophone 60, that is, with respect to North, and this output may be provided to Processing/Control Unit 58, for example, so that the bearings of received signals may be determined and represented as compass bearings.

Further in this regard, it is described below that Horizontal Directional Hydrophone 60, for example, is comprised of a plurality of receiving segments and that the signals received by the segments are combined into a summed omnidirectional signal and directional sine and cosine signals having amplitudes representing the bearing of a received signal with respect to the hydrophone segments. In an alternate embodiment, the sine and cosine signals relative to the hydrophone segments may be transformed directly into sine and cosine signals relative to a compass bearing by means of a variable capacitive coupler commonly used, for example, in sonobuoys. In such devices, the coupling between the input and output signals is controlled by a magnetically polarized, compass-like rotating plate forming a variable capacitive coupling between the sine and cosine input and output signals to shift the relative amplitudes of the sine and cosine output signals proportionally to the compass bearing of a second coupling plate which is mechanically coupled to the hydrophone. A similar device may be used with respect to the sine and cosine signals provided from Vertical Directional Hydrophone 62 to provide sine and cosine signals relative to the vertical, except that in this instance the rotating element would be asymmetrically weighted to seek the vertical direction, that is, down, rather than north.

Figure 9:
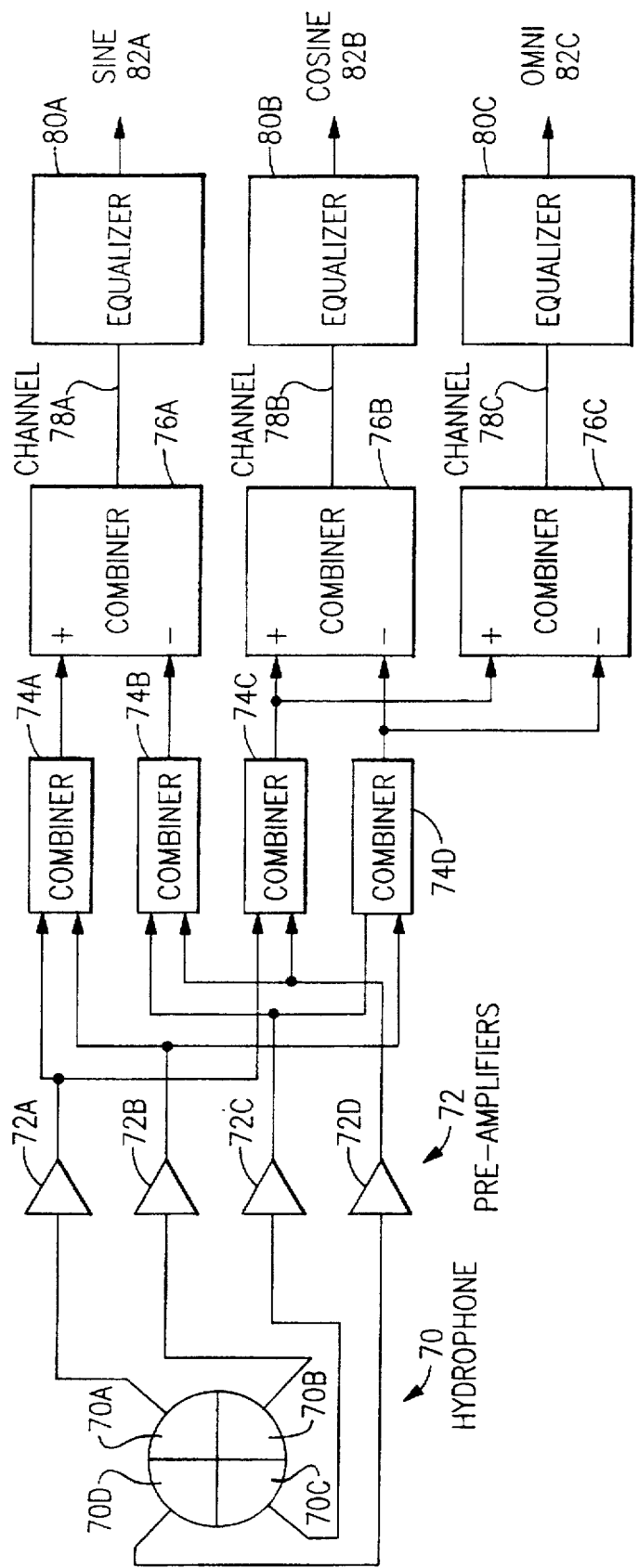
FIG. 9 is a block diagram of a transducer assembly of a communication and position determining unit.

Now considering Horizontal Directional Hydrophone 60 in further detail, and as also exemplary of Vertical Directional Hydrophone 62, it is shown in FIG. 9 that Horizontal Directional Hydrophone 60 is comprised of a four-segment multimode receiving Hydrophone 70, wherein the segments are indicated in FIG. 9 as Segments 70A, 70B, 70C and 70D. As is well understood in the relevant arts, this signal outputs of Segments 70A to 70D of this type of hydrophone may be connected and combined as illustrated in FIG. 9 to comprise four directionally sensitive receiving channels which are equivalent to the corresponding outputs of a pair of mutually perpendicular dipole microphones.

In the present embodiment, each of Segments 70A to 70D is a quarter cylinder of piezoelectric ceramic material which produces as a signal output a voltage in representative of pressure changes on the piezoelectric material, such as from a sound pressure field. These output signals are amplified by four Pre-Amplifiers 72A through 72D, and linear combinations of the four amplified hydrophone signals are formed by Combiners 74A through 74D and 76A through 76C to form three Signal Channels 78A through 78C, each providing a corresponding channel signal having a selected spatial directivity. As indicated in FIG. 9, Channel 78C is formed to have a channel signal having an omnidirectional characteristic, while Channels 78A and 78B are formed to have channel signals having directional responses which are respectively proportional to the sine and cosine components of the received signal wherein the sine and cosine components of the received signal are functions of the direction, or bearing, of the received signal with respect to the current directional orientation of the hydrophone segments. For this reason, Channels 78C, 78A and 78B are respectively referred to as the omni-channel, the sine-channel and the cosine-channel.

The actual combining of the hydrophone output signals can be done either in the analog domain, as shown in FIG. 9, or in alternative embodiments in the digital domain, after analog to digital conversion as discussed below. The combining of the signals in the digital domain requires one additional analog-to-digital converter (ADC), again as described in the following, but allows more accurate calibration for differences in sensitivity (gain) and frequency response between hydrophone segments.

Finally, and as also shown in FIG. 9, the outputs of Combiners 76A through 76C are each individually equalized by Channel Equalizers 80A through 80C, which compensate for different channel gains through the signal paths from Segments 70A through 70D through Combiners 76A through 76C, and are provided as Sine 82A, Cosine 82B and Omni 82C channel signal outputs to Signal Preprocessor 56, as represented in FIG. 8.

If the Communication/Position Unit 24 also includes an orthogonal pair of vertically disposed dipole receivers to determine the vertical bearing of the received signal, such as Vertical Directional Hydrophone 62, Vertical Hydrophone 62 will be similar to Horizontal Directional Hydrophone 60, including the associated preamplifiers, combiners and channel equalizers. In a like manner, Vertical Hydrophone 62 and its associated circuitry will provide Sine 82A, Cosine 82B and Omni 82C channel signal outputs to Signal Preprocessor 56, except that these channel signals will represented the signal as received with respect to the vertical plane.

Referring again to FIG. 8 and next considering Signal Preprocessor 56, the sine, cosine and omni-directional channel signals from Transducer Assembly 54 are preprocessed by Signal Preprocessor 56 before being provided to Processing/Control Unit 58, which detects the received signal, determine time of arrival and bearing of the received signal, determines the range and bearing to the transmitting unit, and any information transmitted from the transmitting unit. In the presently preferred embodiment of a Communication/Position Unit 24, these preprocessing operations are performed in the analog domain and include bandpass filtering of the channel signals, analog to digital conversions of the filtered signals, and storing of the digitized and filtered channel signals pending processing of the signals by to Processing/Control Unit 58.

As shown in FIG. 8, therefore, the Sine 82A, Cosine 82B and Omni 82C channel signals are received from Transducer Assembly 54 and are each bandpass filtered by a corresponding one of Bandpass Filters 84A, 84B and 84C wherein Bandpass Filters 84A, 84B and 84C may be sharp passive or switched capacitor analog filters. Bandpass Filters 84A, 84B and 84C operate to limit the frequency content of the Sine 82A, Cosine 82B and Omni 82C channel signals to precisely the transmit frequency spectrum, including guard bands and possible doppler offsets. As previously discussed, Signals 14 with Guard Bands 22 lie in the range of 26 KHz to 30 KHz in the presently preferred embodiment, so that Bandpass Filters 84A, 84B and 84C must be relatively sharp filters, that is, must have relatively narrow bandpasses with relatively steep cutoff slopes. It is well known to those of skill in the relevant arts that sharp analog filters introduce significant phase distortion into the signals, which may result in corresponding errors in determining the positions of units. In the presently preferred embodiment of Communication/Position Units 24, therefore, the phase distortion introduced by Bandpass Filters 84A, 84B and 84C is compensated for in the subsequent digital filters, which are described below.

The Sine 82A, Cosine 82B and Omni 82C channel signals are then sampled and converted to the digital domain by corresponding Analog-to-Digital (A/D) Converters 86A, 86B and 86, which typically can have a sampling rate potentially as low as twice the signal bandwidth without resulting aliasing problems and which in a presently preferred embodiment have 16 bit resolution, that is, provide 16 bit outputs representing the sampled amplitude of the input signal. In a presently preferred implementation, A/D Converters 86A, 86B and 86 operate at under-sampling frequencies, that is, sample and convert the incoming signal at rates lower than twice the highest signal frequency, such as 16 KHz. As is well understood by those of ordinary skill in the relevant arts, under-sampling results in "aliasing", that is, the generation of multiple "copies" of the input signal in the digital domain. As will be described in the following, digital bandpass filtering is then used to select a lower frequency "alias" of the input signal so that the subsequent signal processing can be performed at lower frequencies, thereby requiring less processor throughput to perform the subsequent matched filter processing and allowing the use of less powerful and therefore less expensive processors.

The digitized samples representing the Sine 82A, Cosine 82B and Omni 82C channel signals are then stored in corresponding Memories 88A, 88B and 88C, which in the presently preferred embodiment are first-in, first-out (FIFO) buffer memories. The digitized Sine 82A, Cosine 82B and Omni 82C channel signals are held in Memories 88A, 88B and 88C until each channel can be read to Processing/Control Unit 58 through a Multiplexer (MUX) 90 and subsequently processed in a fashion by Processing/Control Unit 58 to perform matched filtering and constant false alarm rate thresholding to detect the signal and, subsequently, to determine the time-of-arrival and bearing of the signal. It is, therefore, preferable that each of Memories 88 have a storage capacity sufficient to hold the signal samples received over at least a Time Slot 18, and possible over a Time Slot 18 plus a Reverberation Delay Interval 20. The width of each Memory 88 is, of course, determined by the number of bits resulting from the analog to digital conversion of each sample.

Finally in this regard, it has been described above that Transducer Assembly 54 will probably also include an Orientation Sensor 66 and a Depth Sensor 68 which provide information used by Processing/Control Unit 58 in determining the bearing of the received signals and the range of a transmitting unit. For this reason, the outputs of Orientation Sensor 66 and Depth Sensor 68 are also provided to Processing/Control Unit 58 through an A/D Converter 86D and a Memory 88D, as shown in FIG. 8.

Before proceeding with a description of Processing/Control Unit 58, it must first be remembered that Signals 14 are used for both communication and position determining, so that Processing/Control Unit 58 must extract any information encoded in the received Signals 14 as well as determining the bearing and time of arrival of the received Signals 14. As has been discussed, the difference between the communication and position determination modes of operation are that only a single Signal 14 is required for position determination whereas all Signals 14 may be used in communication, so that Processing/Control Unit 58 is required to detect, for example, each Signal 14 and whether each Signal 14 is FM swept-up or FM swept-down.

In the presently preferred embodiment of a Communication/Position Unit 24, the signal processing, position determining and communications decoding operations of Processing/Control Unit 58 are implemented by programs executing on a microprocessor, as indicated in FIG. 8.

Figure 10:
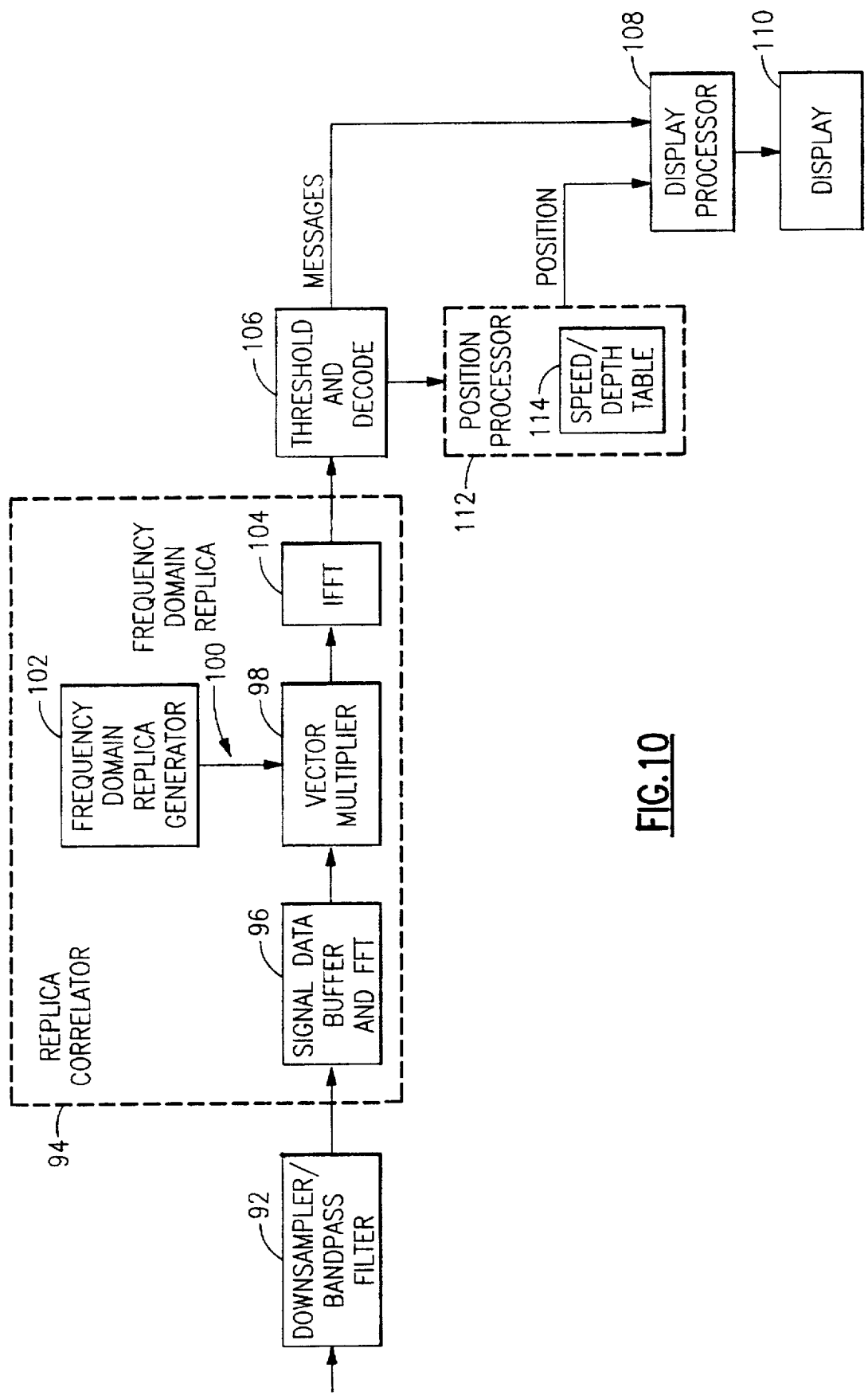
FIG. 10 is a block diagram of a signal processing, communication decoding and position determining, and control processor of a communication and position determining unit.

Referring to FIG. 10, which is a block diagram of the operations of Processing/Control Unit 58, Processing/Control Unit 58 processes the data representing the digitized samples representing each of the Sine 82A, Cosine 82B and Omni 82C channel signals in turn, first using a first passing the Sine 82A, Cosine 82B and Omni 82C digitized channel signals to Downsampler/Bandpass Filter 92, which samples the data at an undersampling frequency lower than twice the highest signal frequency to create a set of non-overlapping spectral aliases and selects one of the aliases for processing by digital bandpass filtering. It will be noted that, as described above, the phase shifts introduced through or by Bandpass Filters 84 are compensated for in Downsampler/Bandpass Filter 92.

Processing/Control Unit 58 then passes the selected spectral alias to a Replica Correlator 94, which performs a replica correlation operation on the selected spectral alias as previously discussed, using operations in the frequency domain in the presently preferred embodiment. As represented in FIG. 10, Replica Correlator 94 includes a Signal Data Buffer and Fast Fourier Transform (FFT) 96 wherein the data is zero padded, that is, the array of data is lengthened by appending an array of zeros so that if the signal is of length N samples the padded length is 2N samples, and a Fast Fourier Transform is performed. Next, the complex conjugate of the Fast Fourier Transform of the zero padded replica is multiplied in Vector Multiplier 98, sample by sample, with a Frequency Domain Replica 100 of the data generated by a Frequency Domain Replica Generator 102. The result is then passed through a 2N point Inverse FFT (IFFT) Processor 104, with the result being the cross correlation of the replica and the data, as a function of time lag.

The output result of IFFT 104 is passed to a Threshold and Decoder 106, which applies a constant false alarm rate moving average threshold, based on the local noise mean, to the output of IFFT 104 to perform the signal detection and to extract the encoded information, that is, to perform an up/down sweep discrimination. The extracted encoded information is then passed to a Display Processor 108 and Display 110 to display the encoded information transmitted from the transmitting Communication/Position Unit 24.

Further considering the detection of Signals 14 conveying data to be communicated from the transmitting Communication/Position Unit 24 to the receiving Communication/Position Unit 24, the presently preferred embodiment utilizes a single signaling band, that is, a single Signal 14, as a detection channel to detect the time or point of occurrence of each Data Block 10 in the digitized data stream in order increase processing throughput. Once the detection channel Signal 14 is located within the digital stream of data, the simultaneously transmitted data channels can be processed for replica correlation to detect and decode the information "bits", that is, Data Bits 12. The actual detection of Data Bits 12 require distinguishing between up and down FM sweeps and is accomplished by comparing, that is, computing the ratio of, the relative magnitudes of the replica correlation peaks from matched filtering with both up-sweep and down-sweep FM replicas.

Further with regard to the implementation of Processing/Control Unit 58, Threshold and Decoder 106 may be implemented using a constant false alarm rate thresholding (CFAR) method, which is used for processing of the detection channel in the presently preferred embodiment of Processing/Control Unit. With this approach, the energy of the signal, after matched filtering and of a particular time cell or sample being processed, is compared to a threshold value equal to some fixed factor time the average of adjacent time cell energies.

Threshold and Decoder 106 may also be implemented using a two-pass CFAR method, wherein the peak amplitude of the detected signal, and the shape of the auto-correlation function of the signal, can be applied after the first pass, to subtract out the signal effect on the noise threshold value. Multipass algorithms may also be utilized.

Continuing with the operation of Processing/Control Unit 58 in determining the range and bearing of the transmitting unit, the processing of each signaling Frequency Band 16, including the detection band, will thereby result in an amplitude value for each of the Sine 82A, Cosine 82B and Omni 82C channel signals. The direction of arrival, that is, the bearing of the transmitting unit, is determined by Processing/Control Unit 58 as a function of the cross correlations between the signal replica and the sine, cosine, and omni channels.

Figure 11:
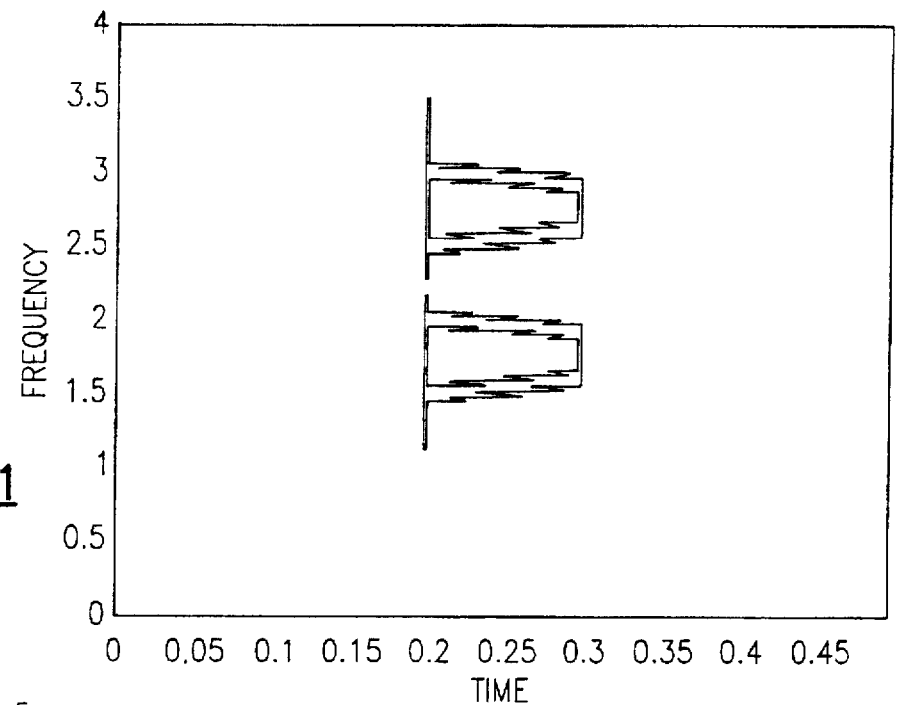
FIG. 11 is a representation of a transmission from a communication and position determining unit.

In this regard, FIG. 11 shows a time-frequency representation of the Signal 14 structure of a transmission with multiple, for example, four, FM replicas transmitted in parallel, making use of the encoding scheme described above. The abscissa represents time and the ordinate represents frequency. The amplitude at each frequency is represented as image intensity.

In the ideal case, with a calibrated, single multi-mode hydrophone which is vertically oriented so that the lobe maxima of the hydrophone receiving pattern lie in the horizontal plane, the sine, cosine and omni channels will produce identical responses to the signal which may be described by the following, after matched filtering.

(Matched Filtered) sine channel output=G sine(q) Rss (t)

(Matched Filtered) cosine channel output=G cosine(q) Rss(t)

(Matched Filtered) omni channel output=G Rss(t) where G is the channel gain multiplied by the propagation gain, q is the azimuthal (horizontal) arrival angle, and Rss(t) is the autocorrelation function of the signal in the band being processed.

The angle of bearing, or signal reception, q can ideally be determined from the equation:

$$q=\arctan(\text{sine}(q)/\text{cosine}(q))$$

where the sine and cosine information are determined from examining the peak of the detected sine channel and cosine channel outputs. The location of this peak in time determines the time of arrival, which then, in turn, is used to derive the round-trip travel time of the signal. Comparison of the sign (polarity) of the detected autocorrelation peaks for the omni, sine, and cosine channels allows determination of the correct quadrant for q.

Figure 12:
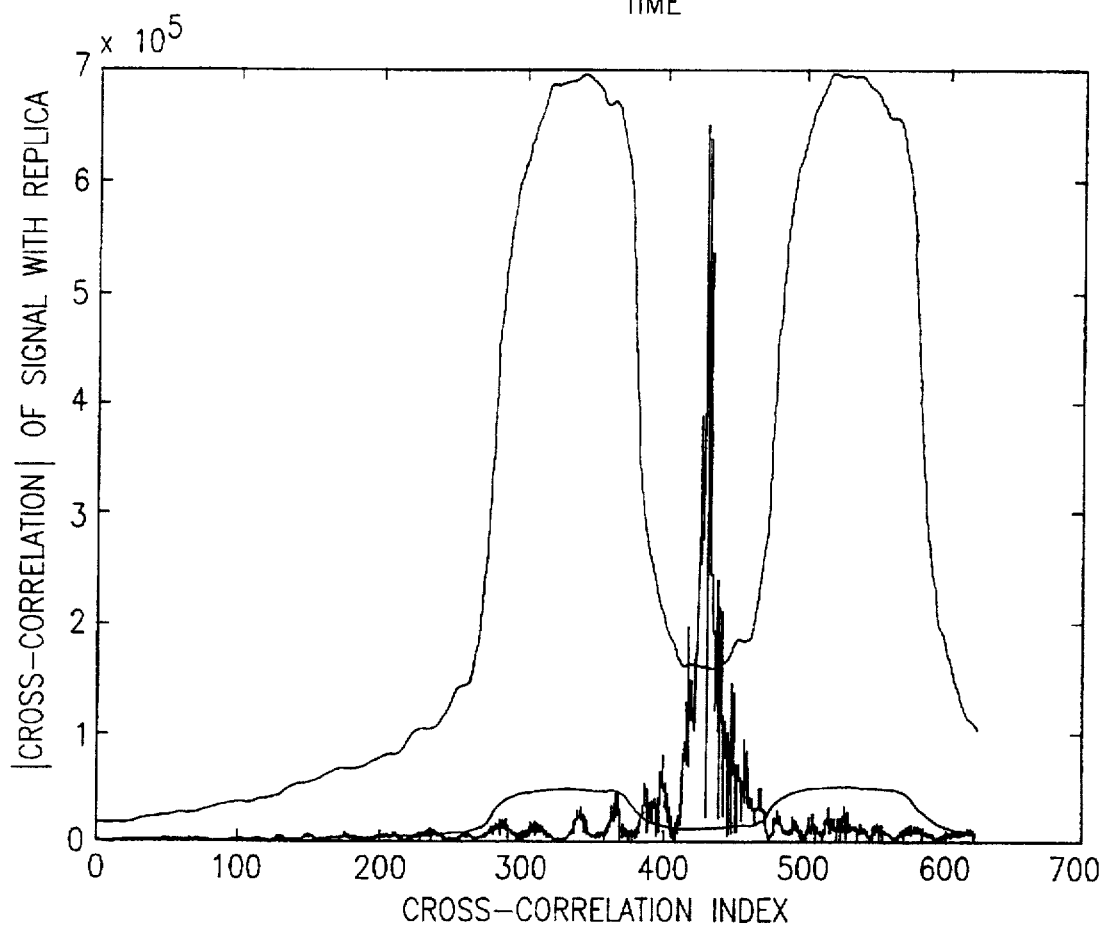
FIG. 12 is a representation of the results of a replica correlation.

Next considering the detection process and referring to FIG. 12, a replica correlation peak is shown as compared to surrounding values of the matched filter output. The time value of the peak is a maximum likelihood estimator of the signal arrival time, used to calculate round trip signal travel time. A "zoom" closeup of this same peak would show that this peak is clearly distinguishable from the surrounding noise. A threshold value is determined by deriving a local noise mean from signal values not including a sample under test, and is set at a fixed multiple of this noise mean. The sample under test is then compared to the threshold to detect the peak.

FIG. 12 shows this detection process, wherein the upper smooth curve is the moving threshold, the lower smooth curve is the moving noise mean, and the noisy curve is the matched filter output. This result illustrates the high degree of performance of this thresholding and peak location technique.

In addition, averaging of the peak locations in the time domain at the output of the matched filtering/thresholding process for each frequency band on each of the hydrophone sine, cosine and omni channels improves the accuracy of the arrival time estimate. Similarly, averaging the bearings derived from the multiple signaling bands increases the accuracy of this estimate, as well.

Therefore, as shown in FIG. 10 and in accordance with the above, Processing/Control Unit 58 passes the outputs of Threshold and Decoder 106 to Position Processor 112 which operates as described above to determine the range and bearing of the transmitting unit from the receiving unit, in the manner described above, and to determine the doppler range change or the transmitting unit with respect to the receiving unit when the unit is operating in the passive bearing/range rate tracking mode. In this regard, it has been described that when operating in the preferred mode an interrogating unit will transmit an Interrogation Signal 28, a receiving unit will respond with a first Response Signal 30 upon receiving the Interrogation Signal 28, and the interrogating unit will respond to the first Response Signal 30 by transmitting a second Response Signal 38. The interrogating unit and the receiving unit will therefore each have information representing the round trip propagation time between the units, respectively the time between the transmission of the Interrogation Signal 28 and the receiving of first Response Signal 30 and the time between the transmission of the first Response Signal 30 and the receiving of the second Response Signal 32.

It has been described, however, that each unit will add a delay representing the signal processing times in the units to the round trip propagation times, and that this processing delay must be compensated for to avoid a resulting range error. This processing delay, however, will be known and constant, and in the presently preferred embodiment is corrected or compensated for by programming an expected maximum processing time into the scheduling of each response transmission. This constant is them subtracted from the measured round trip transmission time in determining the actual round trip transmission time between the units.

It should also be noted that Position Processor 106 will include a Speed/Depth Table 114 storing the table or tables relating the local speed of propagation of sound in water to depth, and that Position Processor 106 will use Speed/Depth Table 108 together with depth information obtained from Depth Sensor 68 in determining the range and bearing of the transmitting unit from the receiving unit, and to determine the doppler range change or the transmitting unit with respect to the receiving unit.

Finally, it must be noted that if the hydrophone is not oriented to the horizontal plane, then the azimuthal responses are not sine/cosine shaped, but are instead cross sections of the three dimensional beam pattern of the transducer array. The use of two perpendicular multimode transducer arrays, as discussed previously, will produce superior performance in this case, with Signal Preprocessor 56 including an Array Switch 116 controlled by Processing/Control Unit 58 to switch between the two transducer arrays according to an orientation angle determined by Orientation Sensor 66. Alternatively, the number of channels in Signal Processor 56 may be increased as necessary to accommodate a sine, cosine and omni channel from the second hydrophone array in the same manner as described above, to allow simultaneous use of both hydrophones and additional processing by Processing/Control Unit 58, similar to that described above, to determine the angle of arrival of the signal in three dimensions.

Finally, it has been described that each Communication/Position Unit 24 also transmits Signals 14 and, for this purpose, each Communication/Position Unit 24 will include a Signal Generator 118 to generate Signals 14 and a Transmit Control/Driver 120 operating under control of Processing/Control Unit 58 to encode and transmit data as Signals 14 in Data Blocks 10.

This data may include, for example, the Communication/Position Unit 24 identification, predetermined messages selected, for example, by single user keystrokes entered through a User Input Device 122, which may be a suitable keypad device, messages created by a user by alphanumeric keystroke inputs through User Input Device 122, and data, such as depth information received from Depth Sensor 68 and the positional information determined by Processing/Control Unit 58. This data may also include environmental data, such as water temperature, salinity, local speed of sound measurements, user monitoring data, such as diver physiological measurements representing, for example, body temperature, heart rate, and so on, and diver status information, such as air and power reserves. As indicated in FIG. 8, certain of this data such as the Communication/Position Unit 24 identification and predetermined messages may be stored in a memory or registers of Processing/Control Unit 58, hardwired into the Communication/Position Unit 24, or otherwise stored in the Communication/Position Unit 24, all of which are functionally and structurally represented by Message Memory 124, while other of the data will be generated as needed by Processing/Control Unit 58.

As represented in FIG. 8, the data to be transmitted by a Communication/Position Unit 24, whether generated by Processing/Control Unit 58 or read, for example, from a Message Memory 124, is stored as one or more Data Words 10 in a Transmit Buffer 126, which again may be a memory or registers of Processing/Control Unit 58. The Data Words 10 to be transmitted are then provided to Signal Generator 118, one Data Word 10 at a time, under control of a Transmit Control Signals 128 output of Control/Processing Unit 58, which control the sequence and timing of the transmission of the Data Words 10. The Data Words 10, in turn, control the operation of Signal Generator 118 to generate the Signals 14 representing the Data Bits 12 of each Data Word 10, for example, and in the presently preferred embodiment, whether the hyperbolic FM Signals 14 are swept up or down to represent logic "0s" or "1s". The low power Signal 14 outputs of Signal Generator 118 are then provided to Transmit Control Driver 120, which also operates under the control of Transmit Control Signals 128 to drive Transmit Transducer 64, thereby transmitting the Data Words 10.

In a presently preferred embodiment of Communication/Position Units 24, Signals 14 will be transmitted by Transmit Control/Driver 120 and Transmit Transducer 64 at power levels of ½ watt to 10 watts, and typically at approximately 5 watts, which will provide an effective typical operating range for the units of 1 nautical mile to 5 nautical miles, depending upon sound propagation conditions. In as much as the design and implementation of a Signal Generator 118 and a Transmit Control/Driver 120 will be understood by those of ordinary skill in the relevant arts, these elements of a Communication/Position Unit 24 will not be discussed further herein.

Lastly, Processing/Control Unit 58 will generate and provide a Blanking Signal 130 to Transducer Assemblies 54 to blank, for example, four Pre-Amplifiers 72A through 72D when the unit is transmitting. Again, the use of a Blanking Signal 130 to switch Transducer Assembly 54 between the transmit and receive modes is well understood by those of ordinary skill in the arts and will not be discussed further herein.

Finally, an alternative method for determining the angle of bearing is to make use of a pattern matching algorithm to perform directional estimation of the arrival angle of signals wherein a pattern matching algorithm takes as an input the normalized sine, cosine and omni channel matched filter outputs and provides as an output the closest of N preselected or predetermined bearing angles of arrival. A number of such algorithms are well known to those of ordinary skill in the practices of pattern matching, or category learning. For example, one such algorithm is multi-layer perception (MLP) trained by a backpropagation algorithm, such as described in "Learning Representations by Back-propagating Errors" by Rummelhart, Hinto and Williams, published in 1986 in Nature, 323:533–536.

Such algorithms may be applied to the present direction fining application by training the MLP on inputs derived from sine, cosine and omni channel signals which are either accurately simulated data or actual calibration data, an supervised categories corresponding to a set of directions, or bearings, of arrival with appropriate angle quantization. Other pattern matching algorithms which could be used are also known in the relevant literature, such as the binary tree classifier algorithm described in "Pattern Recognition and Prediction with Applications to Signal Characterization" by David Kil and Frances Shin, published in 1996 in AIP Press, Chapter 8, Section 8.3.3.

The above described direction estimation method using pattern matching algorithms may be generalized and implemented to perform three dimensional angle of arrival estimation in conjunction with, for example, a three dimensional transducer used in place of the four section multi-mode transducer formed by the combination of Horizontal Directional Hydrophone 60 and Vertical Directional Hydrophone 62. An exemplary three dimensional hydrophone would be comprised of a segmented spherical transducer wherein each segment is a quarter hemisphere of the spherical transducer body, thereby providing eight transducer segments. Combiners 74 and 76 of Transducer Assembly 54 illustrated in FIG. 9 would be accordingly expanded and modified to provide a combining network which would combine the signal outputs of the eight directionally oriented transducer segments to provide signals corresponding to a directionally multi-lobed receiving pattern in a manner analogous to the combining of the segment signal outputs of Horizontal and Vertical Directional Hydrophones 60 and 62 to provide sine, cosine and omni channel signals. Eight permutations of this combining network, corresponding to eight rotations or lobes of the receiving pattern, would be used to provide eight distinct multi-lobe receiving signal channels that are identical to one another except for their angles of rotation. As previously illustrated for a single channel in FIG. 8, the eight signal channels would then be filtered by matched filters, digitized and stored, with a proportionate replication of Bandpass Filters 84, A/D Converters 86 and Memories 88 to accommodate the eight channels, and the outputs, referred to as "features", provided to the pattern matching algorithm through an expanded Multiplexer 90. The pattern matching algorithm would be implemented in Processing/Control Unit 58 in the same manner as the bearing determination process previously discussed. The output of the pattern matching algorithm would then be a selected one of a set of pre-selected or pre-determined direction vectors which would best correspond to the received eight channel feature vector signals.

It will be appreciated by those of ordinary skill in the relevant arts that the three dimensional estimation described above obviates the need for a pair of multi-mode hydrophone, combining the two hydrophones into a mechanically simpler single transducer, and in general will provide better performance in determining the bearing of a received signal.

It will also be appreciated by those of ordinary skill in the relevant arts that the above described three dimensional transducer is not limited to use with the above described pattern matching algorithm, but may be used with the previously described implementation of Communication/Position Unit 24 using a Horizontal Directional Hydrophone 60 and a Vertical Directional Hydrophone 62 and comparison of the amplitudes of the sine, cosine and omni channel signals to determine the bearing of a received signal. In this instance, the signal combining circuits comprised of Combiners 74 and 76 would again be expanded and modified into a combining network as described above, and replicated to provide eight channels of sine, cosine and omni signals. Bandpass Filters 84, A/D Converters 86 and Memories 88 would likewise be replicated to accommodate the eight channels, while Multiplexer 90 would be proportionally expanded. Processing/Control Unit 58 would then compare the relative normalized amplitudes of the sine and cosine signals of the eight channels, as described previously with regard, for example, to the signals provided from Horizontal Directional Hydrophone 60, to determine the bearing of the received signal. In this implementation, however, it will be necessary to compare normalized sine and cosine signals among the eight channels, thereby increasing the processing requirements of Processing/Control Unit 58 but providing a more accurate result than could be achieved with Hydrophones 60 and 62 and allowing the use of a mechanically simpler single transducer rather than two separate transducers.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A communication and position determining device for use in an underwater location and communication system, comprising:

a control unit for selecting a sequence of one or more data words containing information to be communicated to a second communication and position determining device wherein each data word includes a plurality of data bits, a signal generator responsive to each data word for generating a plurality of concurrent signals wherein each signal represents a data bit of a data word and occupies a different frequency band, a directional receiving hydrophone assembly for receiving each data word transmitted by another communication and position determining device and generating omni, sine and cosine channel signals respectively representing the data word signals and the sine and cosine directional components of the data word signals received by the hydrophone assembly, and a signal processing unit connected from the directional receiving hydrophone and responsive to a first response signal of a first response data word transmitted by another communication and position determining device in response to the interrogation data word for detecting the time of reception the first response signal, and determining the bearing of reception of the first response signal wherein the bearing of reception of the first response signal represents the bearing of the other communication and position determining device with respect to the communication and position determining device, and determining the range between the communication and position determining device and the other communication and position determining device as represented by the round trip propagation interval between the communication and position determining units as represented by the interval between the transmission of the interrogation signal of the interrogation data word and the reception of the first response signal of the first response data word, wherein each signal is selected from one of a pair of upswept and downswept frequency modulated signals that can be discriminated from one another and wherein one waveform of the pair represents a logic 1 and the other waveform represents a logic 0, and wherein the frequency bands are separated from one another by guard bands having widths sufficient to prevent intersymbol interference between the signals representing the data bits of a data word, and successive data words are separated sequentially in time by intervals having a duration sufficient to prevent intersymbol interference between the signals of successive data words, and an acoustic transducer connected from the signal generator for concurrently transmitting the plurality of signals representing a data word.

2. The communication and position determining device of claim 1 wherein the width of the guard bands in frequency is greater than signal doppler and phase/frequency shifts arising from the propagation characteristics of the signals through water along the signal propagation paths between the communication and position determining devices.

3. The communication and position determining device of claim 1 wherein the separation in time between successive data words is greater than the multipath reverberation time along the signal propagation paths between the communication and position determining devices.

4. The communication and position determining device of claim 1 wherein each signal is a frequency modulated signal.

5. The communication and position determining device of claim 1 wherein each signal is selected from one of a pair of upswept and downswept frequency modulated signals.

6. The communication and position determining device of claim 1 wherein each signal is a hyperbolic swept frequency modulated signal.

7. The communication and position determining device of claim 1 wherein each signal is a orthogonal pseudo-noise sequence.

8. The communication and position determining device of claim 1 wherein each signal is a pulsed phase modulated carriers.

9. The communication and position determining device of claim 1 wherein each signal is a binary frequency shift keyed signal.

10. The communication and position determining device of claim 1, further comprising:

a receiving hydrophone assembly for receiving signals transmitted by another communication and position determining device, and a signal processing unit connected from the receiving hydrophone assembly for detecting the signals transmitted by the other communication and position determining device identifying the signals representing the data bits of each data word transmitted by the other communication and position determining device, and providing outputs representing the data transmitted in the data words by the other communication and position determining device.

11. The communication and position determining device for use in an underwater location and communication system, comprising:

a control unit for selecting a sequence of one or more data words containing information to be communicated to a second communication and position determining device wherein each data word includes a plurality of data bits, a signal generator responsive to each data word for generating a plurality of concurrent signals wherein each signal represents a data bit of a data word and occupies a different frequency band, wherein the signals have waveforms selected from a pair of fade resistant waveforms that can be discriminated from one another and wherein one waveform of the pair represents a logic 1 and the other waveform represents a logic 0, and the frequency bands are separated from one another by guard bands having widths sufficient to prevent intersymbol interference between the signals representing the data bits of a data word, and successive data words are separated sequentially in time by intervals having a duration sufficient to prevent intersymbol interference between the signals of successive data words, and an acoustic transducer connected from the signal generator for concurrently transmitting the plurality of signals representing a data word, the control unit responsive to a user command to determine the location of the communication and position determining unit with respect to another communication and position determining unit for generating an interrogation data word, the signal generator responsive to the interrogation data word for generating the signals of the interrogation data word wherein at least one signal of the interrogation data word is an interrogation signal, the acoustic transducer is responsive to the signal generator for transmitting the signals of the interrogation data word, including the at least one interrogation signal, a directional receiving hydrophone assembly for receiving a data word transmitted by another communication and position determining device and generating omni, sine and cosine channel signals respectively representing the data word signals and the sine and cosine directional components of the data word signals received by the hydrophone assembly, and a signal processing unit connected from the directional receiving hydrophone and responsive to a first response signal of a first response data word transmitted by another communication and position determining device in response to the interrogation data word for detecting the time of reception the first response signal, and determining the bearing of reception of the first response signal wherein the bearing of reception of the first response signal represents the bearing of the other communication and position determining device with respect to the communication and position determining device, and determining the range between the communication and position determining device and the other communication and position determining device as represented by a round trip propagation interval between the communication and position determining units as represented by the interval between the transmission of the interrogation signal of the interrogation data word and the reception of the first response signal of the first response data word.

12. The communication and position determining device of claim 11, wherein:

the control unit is responsive to the reception of the first response signal for generating a second response data word, the signal generator is responsive to the second response data word for generating the signals of the second response data word wherein at least one signal of the second response data word is a second response signal, and the acoustic transducer is responsive to the signal generator for transmitting the signals of the second response data word, including the at least one second response signal.

13. The communication and position determining device of claim 11, wherein:

the signal processing unit is responsive to an interrogation signal of an interrogation data word transmitted by another communication and position determining device for detecting the time of reception the interrogation signal, and determining the bearing of reception of the interrogation signal wherein the bearing of reception of the interrogation signal represents the bearing of the other communication and position determining device with respect to the communication and position determining device, and the control unit is responsive to the interrogation signal for generating a first response data word, the signal generator is responsive to the first response data word for generating the signals of the first response data word wherein at least one signal of the first response data word is a first response signal, the acoustic transducer is responsive to the signal generator for transmitting the signals of the first response data word, including the at least one first response signal, the signal processing unit is responsive to a second response signal of a second response data word transmitted by another communication and position determining device in response to the interrogation data word for detecting the time of reception the second response signal, and determining the bearing of reception of the second response signal wherein the bearing of reception of the second response signal represents the bearing of the other communication and position determining device with respect to the communication and position determining device, and determining the range between the communication and position determining device and the other communication and position determining device as represented by the round trip propagation interval between the communication and position determining units as represented by the interval between the transmission of the first response signal of the first response data word and the reception of the second response signal of the second response data word.

determining the range between the communication and position determining device and the other communication and position determining device as represented by the round trip propagation interval between the communication and position determining units as represented by the interval between the transmission of the interrogation signal of the interrogation data word and the reception of the first response signal of the first response data word.

14. The communication and position determining device of claim 11, wherein:

the signal processing unit is further responsive to the received signals of each data word transmitted by the other communication and position determining device for identifying the signals representing the data bits of each data word transmitted by the other communication and position determining device, and providing outputs representing the data transmitted in the data words by the other communication and position determining device.

15. The communication and position determining device of claim 11, wherein the directional receiving hydrophone assembly comprises:

a hydrophone having a plurality of directionally oriented receiving segments, a corresponding plurality of first signal combiners connected from the receiving segments for generating first combined signals representing the signals received by directionally oriented pairs of receiving segments, and sine, cosine and omni channel signal combiners connected from the plurality of first signal combiners to generate sine, cosine and omni channel signals respectively representing directional sine and cosine components of the signals received by the segments and a non-directional sum of the signals received by the segments.

16. The communication and position determining device of claim 15, wherein the hydrophone is a vertically oriented, horizontal directional hydrophone oriented with respect to the horizontal plane so that the receiving pattern of the directionally oriented receiving segments is oriented substantially in the horizontal plane.

17. The communication and position determining device of claim 16 further comprising:

a horizontally oriented, vertical directional hydrophone having a plurality of directionally oriented receiving segments, a corresponding plurality of first signal combiners connected from the receiving segments of the vertical directional hydrophone for generating first combined signals representing the signals received by directionally oriented pairs of receiving segments of the vertical directional hydrophone, and vertical sine, cosine and omni channel signal combiners connected from the plurality of first signal combiners to generate vertical sine, cosine and omni channel signals respectively representing directional sine and cosine components of the signals received by the segments of the vertical directional hydrophone and a nondirectional sum of the signals received by the segments of the vertical directional hydrophone, wherein the vertical directional hydrophone is oriented with respect to the horizontal plane so that the receiving pattern of the directionally oriented receiving segments of the vertical directional hydrophone is oriented substantially in a vertical plane.

18. The communication and position determining device of claim 11, further comprising:

a signal preprocessor connected between the directional receiving hydrophone assembly and the signal processing unit and including, a preprocessing channel for each of the channel signals, each preprocessing channel including a bandpass filter connected from a corresponding one of the channel signals and having a bandwidth determined by the total bandwidth of the frequency bands, an analog to digital converter connected from the bandpass filter to convert the corresponding one of the filtered channel signals into a digital time domain representation of the corresponding one of the filtered channel signals, and a received signal sample memory connected from the analog to digital filter for storing time sequential samples of the corresponding one of the filtered channel signals, and a multiplexer connected from the received signal sample memories for sequentially providing the stored time sequential samples of the filtered channel signals to the signal processing unit.

19. The communication and position determining device of claim 17, further comprising:

a signal preprocessor connected between the vertical directional receiving hydrophone assembly and the signal processing unit and including, a preprocessing channel for each of the vertical channel signals, each preprocessing channel including a bandpass filter connected from a corresponding one of the vertical channel signals and having a bandwidth determined by the total bandwidth of the frequency bands, an analog to digital converter connected from the bandpass filter to convert the corresponding one of the filtered channel signals into a digital time domain representation of the corresponding one of the filtered vertical channel signals, and a received signal sample memory connected from the analog to digital filter for storing time sequential samples of the corresponding one of the filtered vertical channel signals, and a multiplexer connected from the received signal sample memories for sequentially providing the stored time sequential samples of the filtered vertical channel signals to the signal processing unit.

20. The communication and position determining device of claim 1, further comprising:

the control unit responsive to a user command to determine the location of the communication and position determining unit with respect to another communication and position determining unit for generating an interrogation data word, the signal generator responsive to the interrogation data word for generating the signals of the interrogation data word wherein at least one signal of the interrogation data word is an interrogation signal, the acoustic transducer is responsive to the signal generator for transmitting the signals of the interrogation data word, including the at least one interrogation signal, a horizontal directional receiving hydrophone assembly having a receiving pattern oriented substantially in the horizontal plane for receiving a data word transmitted by another communication and position determining device and generating horizontal omni, sine and cosine channel signals respectively representing the data word signals and the sine and cosine directional components of the data word signals received by the horizontal direction hydrophone assembly, a vertical directional receiving hydrophone assembly having a receiving pattern oriented substantially in a vertical plane for receiving a data word transmitted by another communication and position determining device and generating vertical omni, sine and cosine channel signals respectively representing the data word signals and the sine and cosine directional components of the data word signals received by the vertical direction hydrophone assembly, and a signal processing unit connected from the horizontal and vertical directional receiving hydrophones and responsive to a first response signal of a first response data word transmitted by another communication and position determining device in response to the interrogation data word for detecting the time of reception the first response signal, and determining the bearing of reception of the first response signal wherein the bearing of reception of the first response signal represents the bearing of the other communication and position determining device with respect to the communication and position determining device, and determining the range between the communication and position determining device and the other communication and position determining device as represented by the round trip propagation interval between the communication and position determining units as represented by the interval between the transmission of the interrogation signal of the interrogation data word and the reception of the first response signal of the first response data word.

21. The communication and position determining device of claim 20, further comprising:

an input multiplexer connected from the omni, sine and cosine channel signals of the horizontal and vertical hydrophone assemblies for selecting and providing as omni, sine and cosine channel signal outputs from the input multiplexer the omni, sine and cosine channel signals of the horizontal and vertical hydrophone assemblies, a signal preprocessor connected between the input multiplexer and the signal processing unit and including, a preprocessing channel for each of the channel signals, each preprocessing channel including a bandpass filter connected from a corresponding one of the channel signals and having a bandwidth determined by the total bandwidth of the frequency bands, an analog to digital converter connected from the bandpass filter to convert the corresponding one of the filtered channel signals into a digital time domain representation of the corresponding one of the filtered channel signals, and a received signal sample memory connected from the analog to digital filter for storing time sequential samples of the corresponding one of the filtered channel signals, a multiplexer connected from the received signal sample memories for sequentially providing the stored time sequential samples of the filtered channel signals to the signal processing unit.

22. The communication and position determining device of claim 18 wherein the signal processing unit comprises:

a downsampler and digital bandpass filter for sampling the time sequential samples of the channel signals at an undersampling frequency lower than twice the highest signal frequency of the channel signals to create a set of non-overlapping spectral aliases and for selecting one of the spectral aliases, a replica correlator for performing a replica correlation on the selected spectral alias, including a buffer and fast fourier transform processor for performing a buffered fast fourier transform of the selected spectral analysis, a replica generator for generating frequency domain replicas of the signals comprising the data words, a vector multiplier for performing a frequency domain vector multiplication of the buffered fast fourier transform of the selected spectral alias and the time domain replicas of the signals, and an inverse fast fourier transform processor for providing as an output the cross correlation between the selected spectral alias and the time domain replicas of the signals, a threshold detector to detect the occurrence of a signal representing a data bit of a data word in the received signals, and a position processor for determining the time of reception and bearing of a signal representing a data bit of a data word.

23. The communication and position determining device of claim 22 wherein the position processor further comprises:

a memory for storing a table relating sound propagation time to receiver range and depth and providing a value representing a local speed of sound propagation through water for use by the position processor in converting the round trip propagation interval into a range between the communication and position determining units.

24. The communication and position determining device for use in an underwater location and communication system, comprising:

a control unit for selecting a sequence of one or more data words containing information to be communicated to a second communication and position determining device wherein each data word includes a plurality of data bits, a signal generator responsive to each data word for generating a plurality of concurrent signals wherein each signal represents a data bit of a data word and occupies a different frequency band, wherein the signals have waveforms selected from a pair of fade resistant waveforms that can be discriminated from one another and wherein one waveform of the pair represents a logic 1 and the other waveform represents a logic 0, and wherein the frequency bands are separated from one another by guard bands having widths sufficient to prevent intersymbol interference between the signals representing the data bits of a data word, and successive data words are separated sequentially in time by intervals having a duration sufficient to prevent intersymbol interference between the signals of successive data words, and an acoustic transducer connected from the signal generator for concurrently transmitting the plurality of signals representing a data word, and a receiving transducer assembly, including a multi-segment, three dimensional spherical directional receiving transducer for receiving a data word transmitted by another communication and position determining device, and for each of a plurality of angles of rotation in three dimensions of a receiving pattern of the transducer, a combining network connected from selected segments of the spherical receiving transducer for generating segment channel signals respectively representing the data word signals and the directional components of the data word signals received by the transducer at a corresponding angle of rotation of the receiving pattern, and a signal processing unit connected from the combining networks for performing a pattern matching operation comparing the signals of each segment channel with corresponding patterns for a set of pre-selected direction vectors and providing as an output a selected one of the set of pre-selected direction vectors which best corresponds to the received vector signals wherein the selected one of the set of pre-selected direction vectors represents in angle of reception in three dimensions of the data word received from the other communication and position determining unit.

25. The communication and position determining device of claim 24, further comprising:

a signal preprocessor connected between the receiving transducer assembly and the signal processing unit and including, for each channel a preprocessing channel for each of the segment channel signals, each preprocessing channel including a bandpass filter connected from a corresponding one of the segment channel signals and having a bandwidth determined by the total bandwidth of the frequency bands, an analog to digital converter connected from the bandpass filter to convert the corresponding one of the filtered channel signals into a digital time domain representation of the corresponding one of the filtered channel signals, and a received signal sample memory connected from the analog to digital filter for storing time sequential samples of the corresponding one of the filtered channel signals, and a multiplexer connected from the received signal sample memories for sequentially providing the stored time sequential samples of the filtered channel signals to the signal processing unit.

26. The communication and position determining device of claim 11. wherein the directional receiving hydrophone assembly comprises:

a multi-segment, three dimensional spherical directional receiving transducer for receiving a data word transmitted by another communication and position determining device, and for each of a plurality of angles of rotation in three dimensions of a receiving pattern of the transducer, a combining network connected from selected segments of the spherical receiving transducer for generating segment channel signals respectively representing the data word signals and the sine and cosine directional components of the data word signals received by the transducer at a corresponding angle of rotation of the receiving pattern.

27. The communication and position determining device of claim 26, further comprising:

a signal preprocessor connected between the direction receiving hydrophone assembly and the signal processing unit and including, for each channel a preprocessing channel for each of the segment channel signals, each preprocessing channel including a bandpass filter connected from a corresponding one of the segment channel signals and having a bandwidth determined by the total bandwidth of the frequency bands, an analog to digital converter connected from the bandpass filter to convert the corresponding one of the filtered channel signals into a digital time domain representation of the corresponding one of the filtered channel signals, and a received signal sample memory connected from the analog to digital filter for storing time sequential samples of the corresponding one of the filtered channel signals, and a multiplexer connected from the received signal sample memories for sequentially providing the stored time sequential samples of the filtered channel signals to the signal processing unit.

* * * * *